US011895120B2

(12) United States Patent
Kapoor et al.

(10) Patent No.: US 11,895,120 B2
(45) Date of Patent: Feb. 6, 2024

(54) MULTIPARTY BINARY ACCESS CONTROLS

(71) Applicants: Vivek Kapoor, Indore (IN); Upendra Kumar Jariya, Indore (IN); Vrinda Tokekar, Indore (IN)

(72) Inventors: Vivek Kapoor, Indore (IN); Upendra Kumar Jariya, Indore (IN); Vrinda Tokekar, Indore (IN)

(*) Notice: Subject to any disclaimer, the term of this patent is extended or adjusted under 35 U.S.C. 154(b) by 327 days.

(21) Appl. No.: 17/059,604

(22) PCT Filed: Mar. 25, 2019

(86) PCT No.: PCT/IB2019/052384
§ 371 (c)(1),
(2) Date: Nov. 30, 2020

(87) PCT Pub. No.: WO2019/229546
PCT Pub. Date: Dec. 5, 2019

(65) Prior Publication Data
US 2022/0150256 A1 May 12, 2022

(30) Foreign Application Priority Data
May 31, 2018 (IN) .............................. 201821020478

(51) Int. Cl.
*H04L 9/40* (2022.01)
(52) U.S. Cl.
CPC .................................. *H04L 63/105* (2013.01)
(58) Field of Classification Search
CPC ... H04L 63/105; G06F 21/6218; G06F 21/604
USPC .......................................................... 726/4
See application file for complete search history.

(56) References Cited

U.S. PATENT DOCUMENTS

| | | | |
|---|---|---|---|
| 7,801,967 B1* | 9/2010 | Bedell | G06F 21/6227 726/4 |
| 7,984,066 B1* | 7/2011 | Kilday | H04L 63/105 707/786 |
| 8,327,419 B1* | 12/2012 | Korablev | H04L 63/105 726/19 |

(Continued)

OTHER PUBLICATIONS

LRBAC: Flexible function-level hierarchical role based access control for Linux, Zandi et al, Sep. 2015 (Year: 2015).*

*Primary Examiner* — Jahangir Kabir
(74) *Attorney, Agent, or Firm* — Myers Wolin, LLC

(57) ABSTRACT

Enterprise applications need to store and evaluate permissions on per User, per Entity and per Action basis for hundreds of Users and thousands of permissions. Most of the times this data takes up to 5 database tables to store the Role Based Access Control (RBAC) permissions. Selecting permissions for user from database consumes time while any User attempts to perform any Action. Sometimes the time taken to check permission is more than time taken to perform the required Action. Thus the current approaches for RBAC are inefficient in all—computation TIME, runtime MEMORY and database STORAGE. Binary arithmetic is known for being vast in scalability, smallest in memory and fastest in speed. This paper describes a new method which uses binary data structure and binary arithmetic to accurately check User permissions. We also claim that this method is the most scalable and fastest possible for Role Based Access Control.

9 Claims, 14 Drawing Sheets

(56) References Cited

U.S. PATENT DOCUMENTS

| | | | | |
|---|---|---|---|---|
| 8,595,798 B2* | 11/2013 | Anand | ................... | H04L 63/20 |
| | | | | 726/4 |
| 2006/0090208 A1* | 4/2006 | Smith | ................... | H04L 63/105 |
| | | | | 713/166 |
| 2010/0242083 A1* | 9/2010 | Begum | ................. | H04L 63/105 |
| | | | | 726/1 |
| 2012/0311672 A1* | 12/2012 | Connor | .................. | H04L 63/10 |
| | | | | 726/4 |

* cited by examiner

FIG. 3
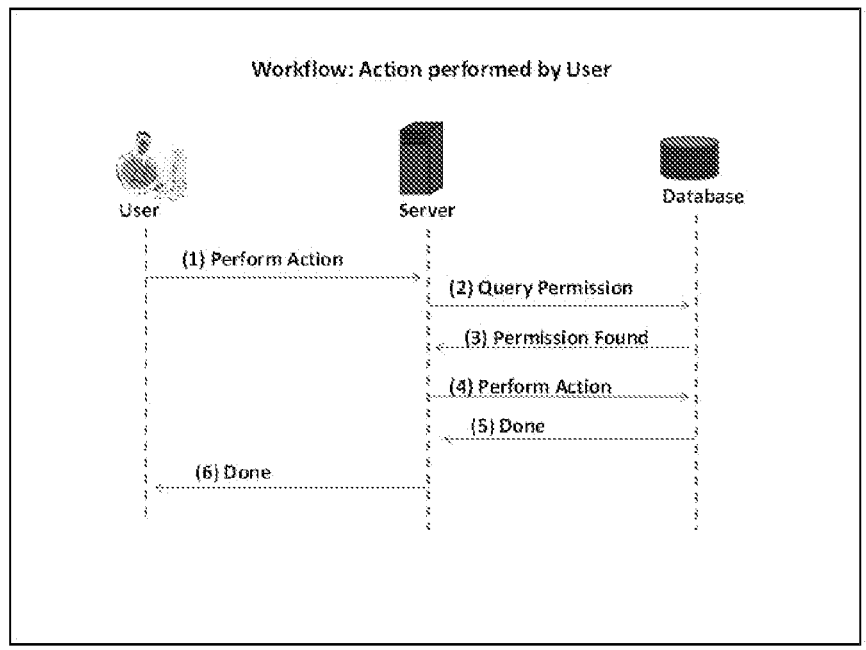
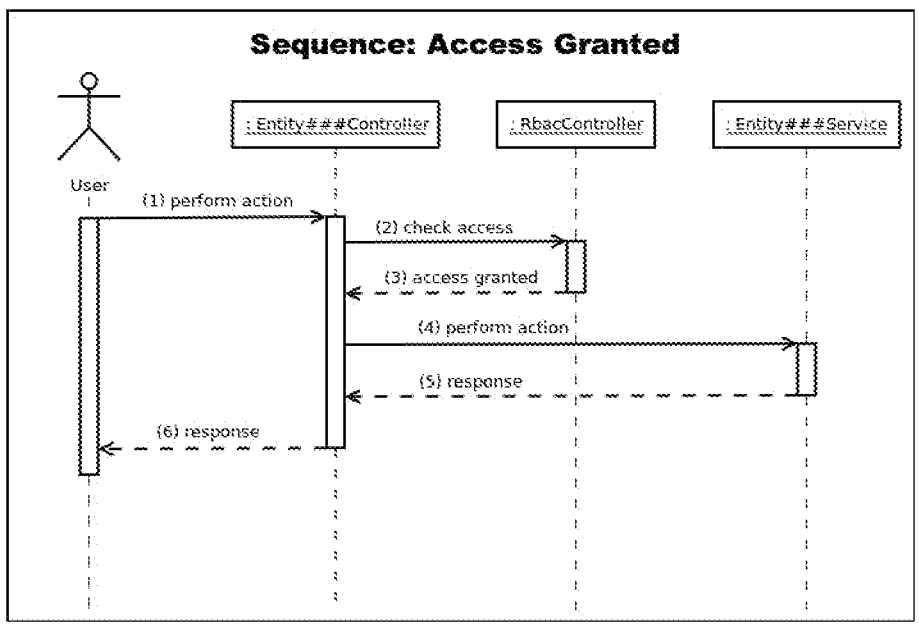
FIG. 4

MULTIPARTY BINARY ACCESS CONTROLS

FIELD OF THE INVENTION

The invention disclosed herein generally relates to the field of access control (AC) in a computer network. In particular, it provides devices and methods useful for provisioning authorization claims on the basis of an attribute/role-based access control (ABAC) policy using Multiparty Binary Access Controls.

BACKGROUND OF THE INVENTION

An ABAC/RBAC policy defines access control permissions based on the attributes/roles of the subject, of the resource, and of the action that the subject wants to perform on the resource. A resource may be, inter alia, a portion of a personal storage quota, a business unit storage quota, an information retrieval system, a (portion of a) database, an online service, a protected webpage or a physical device.

There currently exist general-purpose AC languages that have the richness to express fine-grained conditions and conditions which depend on external data. One particular example of an AC language is the EXtensible Access Control Markup Language (XACML) which is the subject of standardization work in a Technical Committee of the Organization for the Advancement of Structured Information Standards. An XACML policy can apply to many different situations, that is, different subjects, resources, actions and environments and may give different results for them. The XACML specification defines how such a request is evaluated against the policy, particularly what policy attributes are to be evaluated or, at least, which values are required to exist for a successful evaluation to result. Key characteristics of this evaluation process are that the request (the query against the policy) must describe the attempted access to a protected resource fully Efficiency and ease of use is always a high priority, since the ability to efficiently share documents with remote collaborators can become a significant business differentiation for any organization or individual, who will otherwise not be able to effective capitalize on markets and resources if they do not leverage suitable technologies, along with the required ability to protect sensitive business assets. This is an imperative for these organizations and individuals for their business survival. Hence there is a need to enable efficiency and productivity, while preserving safety.

Users, that include primarily information workers, have a need to efficiently author, save, share, locate, retrieve, archive and dispose documents. Other users, such as administrators and regulators, have a need to propagate policies and monitor access enforcement. Often there is a trade-off between ease of use, which is a key underpinning of efficiency, and control, which is a requirement for administration and regulatory compliance.

In the prior art an US specification US20160241399A1 by Dijiang HUANG et al. discloses Efficient Privacy-Preserving Ciphertext-Policy Attribute Based Encryption and Broadcast Encryption wherein a new construction of CP-ABE, named Privacy Preserving Constant CP-ABE (PPC-CP-ABE) that significantly reduces the ciphertext to a constant size with any given number of attributes is disclosed. PPCCP-ABE leverages a hidden policy construction such that the recipients' privacy is preserved efficiently. PP-AB-BE is flexible because a broadcasted message can be encrypted by an expressive hidden access policy, either with or without explicit specifying the receivers. PP-AB-BE significantly reduces the storage and communication overhead. Also, PP-AB-BE attains minimal bound on storage overhead for each user to cover all possible subgroups in the communication system.

Another prior art document US20120300936A1 by Matthew Daniel Green et al. discloses functional encryption (FE) ciphertext is transformed into partially-decrypted (PD) ciphertext. The PD ciphertext has a shorter bit length than the FE ciphertext, or the decryption time of the PD ciphertext is less than the decryption time of the FE ciphertext. The FE ciphertext can be an attribute-based encryption ciphertext. The transformation can be performed with a transformation key generated by an authority with a master key or by a user with a decryption key. The transformation can also be performed, without a transformation key, based on unencrypted components of the FE ciphertext and on auxiliary information associated with the unencrypted components of the FE ciphertext. The PD ciphertext can require less transmission time across a network than the FE ciphertext. The PD ciphertext can require less time to decrypt than the FE ciphertext, particularly when the computational resources performing the decryption are limited. Zeutro, LIc Another prior art document US20150269383A1 Ulrich Lang et al. discloses A system and method for managing implementation of policies in an information technologies system receives at least one policy function, at least one refinement template and at least one available policy function from the at least one memory, receives a policy input indicating a high-level policy for the IT system where the policy input is compliant with the at least one policy function and is received in a format that is not machine-enforceable at an enforcement entity of the IT system, based on the received policy input, automatically or semi-automatically generates a machine-enforceable rule and/or configuration by filling the at least one refinement template, where the machine-enforceable rule and/or configuration includes the at least one available policy function and being compliant with the received policy input, and distributes the machine-enforceable rule and/or configuration to the at least one memory of the IT system or another at least one memory to thereby enable implementation of the policies.

Another prior art document U.S. Pat. No. 9,209,974B1 Joseph Ayo et al. discloses Functional encryption keys can be selected based on a set of criteria that facilitates efficient decryption of ciphertexts. The method includes electronically storing one or more decryption key metadata parameters for a plurality of candidate decryption keys for a functional encryption ciphertext, storing a functional encryption ciphertext, extracting a scheme type of functional input from the ciphertext, extracting a functional input from the ciphertext, searching the metadata parameters to identify a set of candidate keys matching the scheme type of the ciphertext, searching the set of candidate keys to identify a key matching the extracted functional input, and selecting one of the identified candidate keys matching the scheme type and the extracted functional input as a decryption key for the functional encryption ciphertext.

Another prior art document US20170214529A1 Leonardo BARBOSA E OLIVEIRA et al discloses system and method for authentication of things. The Authentication Of Things (AOT) system includes a cloud server configured to control a cloud domain connected with a plurality of devices, a home server configured to control a home server connected with a plurality of devices, a first device corresponding to a new device, and a second device of a root user connected with the home domain while authentication is completed in the home server. In this case, the first device loads cryptographic material of the cloud server from the cloud server in a pre-deployment stage, the cryptographic material includes at least one selected from the group consisting of an identifier of the first device in the cloud server, a first private key of an ID-based cryptography system of the first device in the cloud server, a first pairwise key of the first device in the cloud server, and a counter of the first device, and if the first device is shipped to a trader, the cloud server deletes the first private key from the cloud server.

The challenge is that traditional systems tend to be brittle, antiquated, hence unable to address the emerging needs for geo-collaboration, while emerging systems provide limited functionality and safety. While traditional systems focus on safety and workflows with limited and complex support for bridging across enterprises through mechanisms such as virtual private networks, emerging systems optimize for usability and global sharing and tend to come up short in the areas of access monitoring and enforcement.

The challenge in moving from traditional to emerging solutions is that this generates a schism between the enterprise, represented by the IT administrator and GRC on one hand, and the information worker on the other. Since documents have a propensity for getting lost, retained beyond their specified lifecycle, or being inappropriately modified, due to negligence, accident, malice or greed, this move to cloud systems poses an immediate risk for enterprises.

The discussed XACML-based solutions typically introduce "authorization as a service" whereby a Policy Enforcement Point (PEP) within a target application/system captures access requests in real time and sends them to a Policy Decision Point (PDP) for evaluation against one or more XACML policies. In practice, however, many organizations operate systems for which there are currently no PEP components available, and whose authorization mechanisms are built around other models than ABAC.

The conventional systems and services were often designed to optimize for functionality, rather than ease of use, and also for use within a single organization. The access mechanisms for mobile and remote workers often require VPNs and add to a level of complexity that is compounded when information works are collaborating across organizations. When a mobile worker needs to access disparate repositories in distinct enterprises that are silo'd, this complexity is significantly compounded.

Present, and emerging technologies are tending to make the problems of document collaboration worse, as sharing solutions such as Dropbox® are perpetuating an archaic metaphor of networked and distributed file systems, even while solutions such as Apple iOS® move to an application-centric metaphor, which is in turn is a piecemeal solution to device access to documents. Furthermore, all of these vendors are creating additional data silos as Apple fuses iCloud into their OS-X and iOS offerings, while Microsoft does the same with SkyDrive and Windows, and Google couples GDrive with Google Apps. Third party sharing solutions such as Dropbox and Box attempt piecemeal integration with the platforms such as OS-X, iOS, and Windows, and the applications such as Google Apps, but are at business odds with the storage components such as SkyDrive, GDrive, and iCloud. Hence the present day software and service delivery model is in conflict when these third parties attempt to compete with, or dislodge end-to-end solution stacks from larger vendors such as Apple and Microsoft. All of this detracts from the ability to provide end users with 'collaboration-centric' solutions that are agnostic of platforms, applications, and cloud storage services.

There is an intense and growing need to help the end user to be more productive through document collaboration, and to help organizations be more efficient and safe in protecting their digital assets. However, it is impractical to consider any forklift changes, or expedient global standardizations to improve the existing collective REI. Due to their own business-centric needs, solution providers are exacerbating the problems by generating more data silos and exacerbating the existing REI. Users are reluctant to change their usage behavior, and re-training of the workforce would be a significant burden on organizations. Similarly, enterprise IT has significant investment in IT infrastructures, workflows and IT policies, and it would be significantly costly and complex to rip and replace these. Hence for any 'collaboration-centric' solution it is necessary to make the integration of any new systems and services occur in a manner that is mostly transparent to IWs (Information Workers) and IT Managers.

Some of the other reference prior art as NPL are:—
1 Wikipedia, Role Based Access Control, http://en.wikipedia.org/wiki/Role-based access control
2 Ravi S. Sandhu, David Ferraiolo, Richard Kuhn, The NIST Model for Role Based Access Control: Towards a Unified Standard
3 Ravi S. Sandhu, Edward J. Coynek, Hal L. Feinsteink and Charles E. Youmank, Role-Based Access Control Models, IEEE Computer, Volume 29, Number 2, February 1996, pages38-47
4 DAVID F. FERRAIOLO, JOHN F. BARKLEY, and D. RICHARD KUHN, A Role-Based Access Control Model and Reference Implementation Within a Corporate Intranet, National Institute of Standards and Technology (NIST)
5 INCITS RBAC Task Group, RBAC Implementation and Interoperability Standard (RIIS)
6 Enterprise Application Security Project, OWASP, https://www.owasp.org/index.php/OWASP_Enterprise_Application_Security_Project
7 James Gosling, The Java Language Specification, Third Edition, Sun Microsystems, 2005
8 Sumitabha Das, UNIX Concepts and Applications
9 John F Barkley, Role Based Access Control for World Wide Web
10 NIST, National Institute of Standards and Technology, 2010 Economic Analysis of Role-Based Access Control
11 Axel Kern, Advanced Features for Enterprise-Wide Role-Based Access Control Boon Peng Lim, Omar Zakaria and Mustaffa Kamal Mohd Nor, ROLE-BASED ACCESS CONTROL IN KIDNEY DIALYSIS INFORMATION SYSTEM
13 A. A. Elliott and G. S. Knight, Role Explosion: Acknowledging the Problem
14 Grsecurity The RBAC System, https://en.wikibooks.org/wiki/Grsecurity
15 Aniruddha Bohra, Stephen Smaldone, Liviu Iftode, FRAC: Implementing Role-Based Access Control for Network File Systems

SUMMARY OF INVENTION

To solve the above problems, the present invention provides a method and apparatus for access control, it is possible to effectively manage a networked computing system operating authority information.

Therefore herein disclosed is a method of accessing strategy based on the set of control binary sequence, the binary sequence using the set of inter-domain access control policies based modelling attributes Constraint such modelling can be implemented and designed between the logical operator based on the disclosed authorization item, can be used with a variety of inter-domain policy calculus. The present invention may be used as an efficient and easy method for inter-domain implementation of access control policy synthesis.

The method for access control, comprising: a pre-established attribute based access control of the ABAC model, ABAC model comprising a set of users, a set of roles and permissions set, and the set of permissions for permissions setting permission identifier, according to the rights identifier set in advance for the character set character set identifier role privileges, permission identifier and the correspondence relationship role privileges identifier; obtaining user set the permissions requested by the user, according to the role privileges identifier correspondence between the users and roles.

To achieve the said attribute based access control, firstly, defining a binary sequence sets of elements is carried out based on the set of operational rules of binary sequences, according to the above definitions, attribute decomposition actual policy from the attribute constraint layer, and by a set of internal separation of elements that the correct expression strategy to become a logical expression based on a binary sequence. On this basis, according to the actual security requirements defined set of sequences of binary logic based composite operator, is converted into a logical expression. The binary sequences can be used directly as the characteristics of the data structure, it can be directly calculated according to the logical expression based on the binary result as a conversion policy with arithmetic logic implementation mechanisms. Finally, the property will be translated into binary term strategy based on strategies aggregate form.

The method of controlling the synthesis strategy according to the present invention is based on a set of access binary sequence, comprising the steps of:

Step 1: Check Preconditions
Identify User
  Obtain the User Id of the logged in User from current session
  Throw appropriate error if User can't be identified or session is expired
Identify Action
  Identify the Action being performed by the User
  Throw appropriate error if Action is unknown
Identify Resource
  Identify the Resource on which the Action is being performed
  Throw appropriate error if Resource is unknown
Identify Security Context i.e. Department
  Resource is the part of some Security Context, so obtain the Security Context Id from the Resource.
  Throw appropriate error if current Security Context i.e. Department can not be identified
Step 2: Obtain Security Masks
Role Mask
  Obtain all Security Masks for all the Roles of User into the current SecurityContext
  Binary OR all the above Role Masks to obtain User's Role Mask in the current Security Context
  Throw appropriate error if no Role is configured for the User in current Security Context
Action Mask
  Obtain the Action's Security Mask from the database or fixed configuration
Resource Mask
  Obtain the Resource's Security Mask from the configuration
Location Mask
  Obtain the current Locations's Security Mask from the configuration
Time Mask
  Obtain the Security Mask for current Time from the configuration
Day Mask
  Obtain the Security Mask of Today from the configuration
Network Mask
  Obtain the Security Mask for User's current Network from the configuration
Device Mask
  Obtain the Security Mask for User's current Device from the configuration
Step 3. Binary AND
Perform Binary AND operation i.e. arithmetic multiplication on all the above Attribute Masks to obtain the result of permission check
Result=Role Mask & Action Mask & Resource Mask & Location Mask & Time Mask & Day Mask & Network Mask & Device Mask
Step 4 Result
If the numeric value of above result is greater than zero (0) than return as permission
Granted
If the numeric value of above result is zero (0) than return as permission DENIED The permission rights based on an identifier of the binary operation and the permission identifier is a 40-bit binary string lengths. Wherein, length of the identifiers depends upon number of security levels and number of actions. Corresponding relationship between the [0009] permission identifier and the identifier is the role permissions binary operation or operations. The user acquires permission set requested by the user, based on the role authority identifier, the correspondence relationship between user role, comprising: receiving a permission sent by the user requesting user set and character set characters according to find requested permissions the role of authority identifier, and the requested authority to determine the role of authority identifier corresponding to establish correspondence between the user and role permissions have determined identifier of the role.

In some embodiments, the access policy may enforce conjunctive access policies with wildcards ire constant bit size. In some embodiments, the user's attribute list L may be defined.

BRIEF DESCRIPTION OF THE ACCOMPANYING DRAWINGS

By reading the following detailed description of non-limiting embodiments given with reference to the following figures, other features of the present invention, objects and advantages will become more apparent:

FIG. 3 illustrates pictorial representation of Introduction.3 Workflow of Action performed by User in accordance with the present invention;

FIG. 4 illustrates the Literature Survey on Sequence Authorized Access in accordance with the present invention;

DETAILED DESCRIPTION

Enterprise applications generally have hundreds of Users, hundreds of Entities and thousands of Permissions to protect huge amount of data and resources which are confidential in nature not only for external world but also within the organizational boundaries.

This data varies on a per application basis e.g. HR and payroll applications store data about Employee profile, salary, attendance and promotions this may also include account numbers, personal phone numbers and photos of every employee which should be kept confidential. As another example, Inventory applications will store the make, model and quantity of various objects on a per location basis this application might also include contact information and account numbers of all the suppliers and might also include automated control to order goods and make automated payments from company accounts. Such resources and information needs to be accessed securely in a controlled manner.

Access Control

Figure 1:
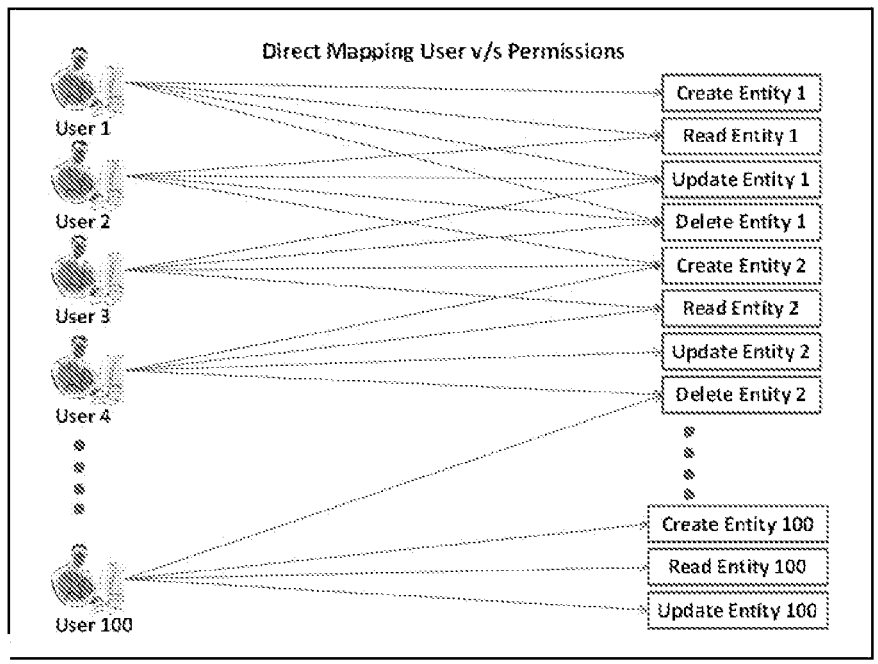
FIG. 1 illustrates pictorial representation of Direct Mapping User v/s Permissions in accordance with the present invention.

Due to aforementioned reason, each User must have assigned certain permissions to access only the resources he is entitled to work with and should not be willingly or accidentally able to read or change any data which is not concerned with him/her as shown in FIG. 1.

FIG. 1 displays a direct mapping between User and Permissions where each User is explicitly assigned all the permissions he must have. This kind of management becomes lengthy as the number of Users increase. When there are hundreds of users, the access control manager will have to remember and assign permissions on a per User basis. If it's required to revoke some access, he has to revoke that access on a per User basis which will take a lot of time.

Since number of Users in an enterprise scaled application may grow in thousands or even lacks e.g. there are more than 1 lack employees in Tata Consultancy Services so a payroll application for all TCS employees will have more than 1 lack registered Users and each will have different permissions based on their Designation or "Role" into the organization.

Now if we start managing Permissions on a per User basis, this will be like managing Permissions for 1 lack users. If somebody has to grant 1 permission to all of the Users using graphical user interface and if 30 seconds are needed to grant 1 permission, following time shall be needed to complete the task:

Time required=1 lack*30 seconds=30 lack seconds=50,000 minutes=833 hours=104 man days=half an year This is the reason, permissions are stored on a per Role basis and Roles are always limited into an Organization which is generally mapped to one's Designation.

Role Based Access Control

Role Based Access Control is the primary tool which is generally used to control and manage the access for various users on various resources. The main idea is: number of Users may reach up to thousands but number of Roles shall always be limited. Hence, the permissions are configured on a per role basis and the roles are assigned to the users.

Figure 2:
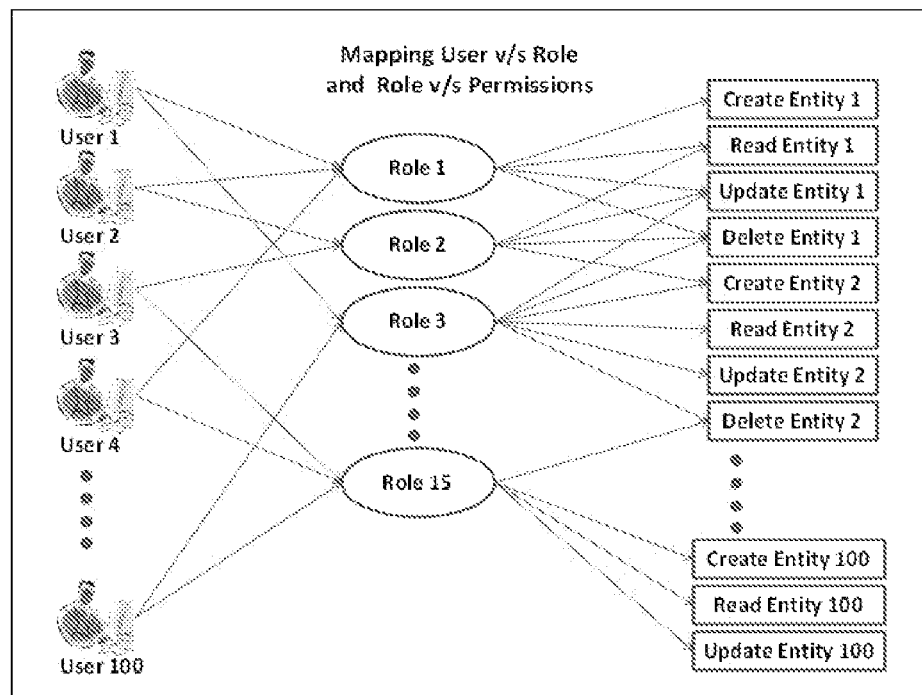
FIG. 2 illustrates pictorial representation of Introduction.2 Mapping User Ids Role and Role v/s Permissions in accordance with the present invention.

FIG. 2 depicts a Role Based Access Control where, if a Role is granted certain access on a resource, all the Users in that Role automatically get access to the resource and when access to some Resource is revoked from some Role, all the Users in that Role are restricted to that Resource.

Elements of Access Control

Important elements for the subject of this document are User, Entity and Action. User refers to a logged in registered User whose Role has certain permissions configured into the system. Action refers to the work being performed by above User e.g. Create, Read, Update or Delete. Entity refers to the system's 'Entity' on which the User has attempted some Action.

For example, say Ramesh is trying to view his payslip for January 2017. Here, User is Ramesh, Action is View or Read and Entity is Payslip of January 2017. Ramesh's success or failure depends upon his Role and Permissions associated with his Role.

Access needs to be controlled where an Operation is being performed on an Entity by an authenticated User. Hence, access control in enterprise applications has 4 basic aspects:

User

Authenticated user has fixed set of permissions to perform certain operations in an enterprise level application. Based on these permissions, user is allowed or denied to perform various actions in the application. Thus, permissions are always stored on a per user basis.

Entity/Model

Generally, enterprise applications have many entity classes. Each entity allows certain operations by some roles and vice versa, denies certain operations to some roles/users. To control this behavior, permissions also need to be stored on a per entity basis.

Action/Operation

CRUD=Create, Read, Update, Delete. Every entity in the application is subject to the CRUD operations. There can be more operations but CRUD is the most basic and most common set of operations. Since entities have different behavior for different operations by different users, permissions also need to be stored on a per operation basis.

Role/Level

Another such aspect is Role. Each User has a Role in the system, based on the role, he/she is assigned Permissions to perform Operations on Entities. Common RBAC systems store permissions for a Role and each User is assigned one or more Roles as per requirements.

Rationale

Enterprise applications need to check User's permission before performing every Action on every click by the logged in User i.e. RBAC module is executed before every Action by the application as shown in FIG. 3. Current implementation for RBAC use database to store and query permission every time, time consumed to query RBAC permission is generally comparable to the time taken in performing the Action.

Enterprise servers approximately spend 25% to 50% of their CPU time in computing User permissions to check whether the logged in user has sufficient access to perform the particular Action on particular Entity/Resource basis.

Server performance can thus be improved by 25% to 50% if time taken to check permission can be reduced.

Problem Definition

An application needs to store and evaluate permissions on per User, per Entity and per Action basis. Majorly, permissions are checked for basic operations i.e. CREATE, READ, UPDATE and DELETE of enterprise entities.

Current implementations use RDBMS tables to store permissions on per role and per user basis. Most of the times this data takes up-to 5 tables to store the RBAC permissions. On every operation by every user, either a very complex nested query or multiple simple database queries are fired to identify if the user has appropriate rights to perform the task. Thus, selecting permissions for user from database also consumes time while user attempts to perform some operation. Once the permissions are checked, the operation is further completed by the system, but if user has insufficient permissions, an error is displayed on the GUI and operation is denied by the system.

The problem with the traditional approach is: sometimes the time taken to check permission is more than time taken to perform required operation. Thus the current approaches for RBAC are inefficient CPU time consumption and Runtime memory.

Literature Survey

This section covers the study of existing methods used in implementing Role Based Access Control (RBAC).

Authentication v/s Authorization

When a registered User attempts to use an enterprise application, he is authenticated by the Login controller on the basis of his User name and Password.

Every Action performed by User on graphical user interface is routed to RBAC Authorization controller to determine if User has appropriate Permission to perform the Action.

Authorized Access

Figure 5:
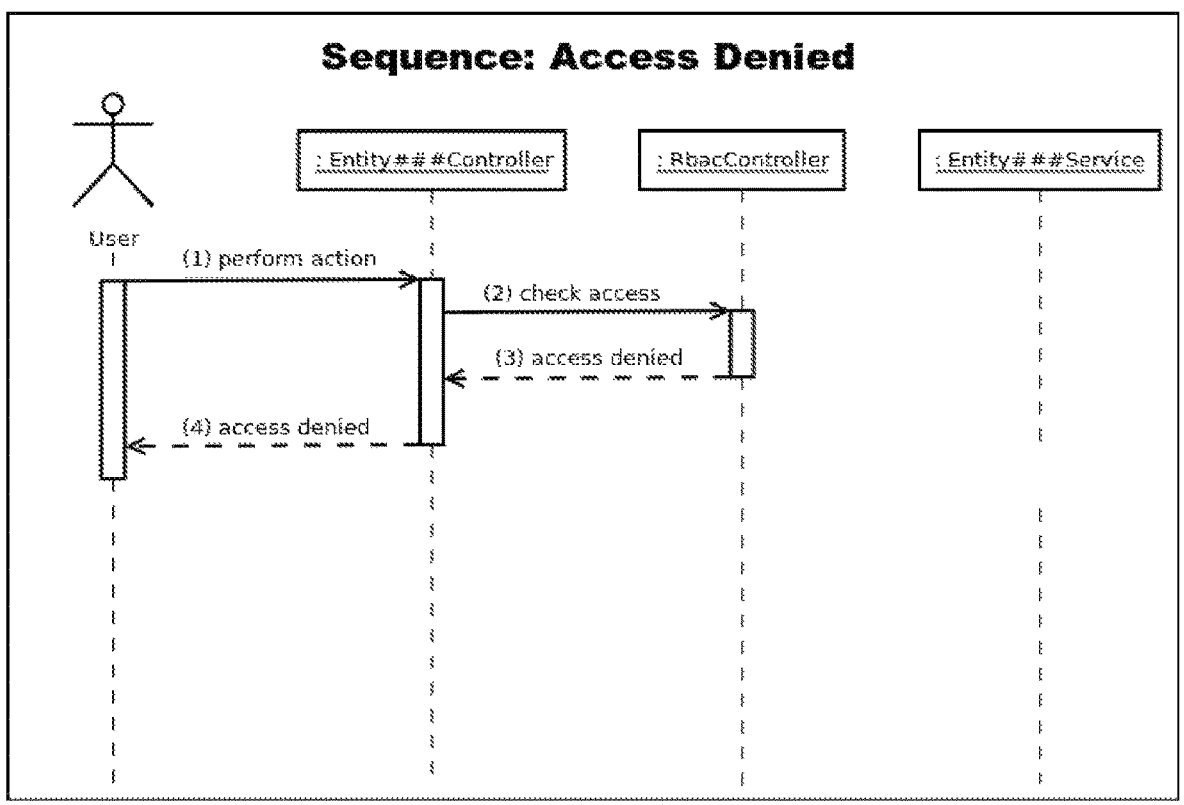
FIG. 5 illustrates Literature Survey on Sequence Unauthorized Access in accordance with the present invention.
Figure 6:
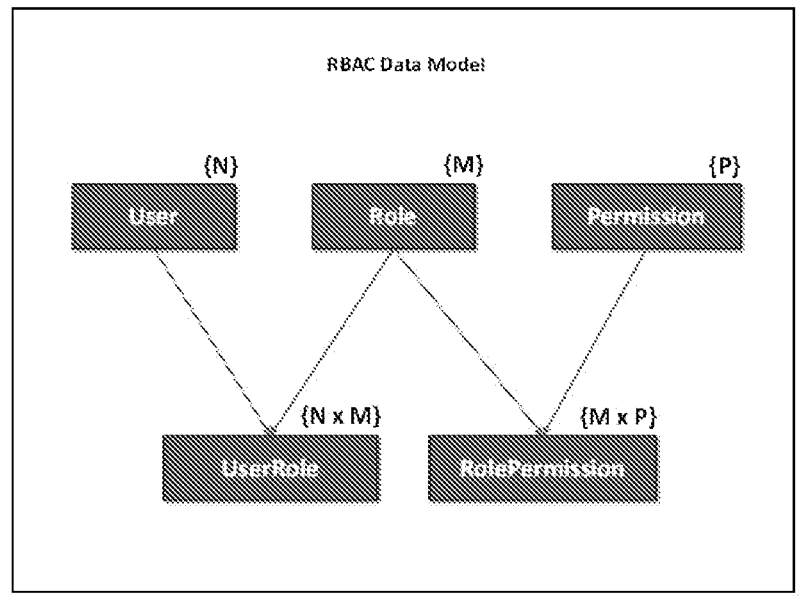
FIG. 6 illustrates Literature Survey on RBAC Data Model in accordance with the present invention.

The FIG. 4 depicts the scenario where logged in User performs some Action on Entity### and the User is authorized to perform the Action Unauthorized Access The FIG. 5 depicts the literature survey scenario where logged in User performs some Action on Entity### and the User is NOT authorized to perform the Action RBAC Data Model In an embodiment the RBAC implementations generally have the Objects as shown in FIG. 6 and their corresponding database tables:

User

User objects and database table stores User information. This contains User Id, Name, Login Id, Password, Last login time, Secret question answers and some contact information about the User.

Role

Role objects and database table stores Role information including Role Id, Name and Description.

Permission

Permission objects and database table stores Permission information including Permission Id, Name and Description.

UserRole

User Role objects and database table serves as mapping between User and Role table. Data elements include User Id and Role Id.

Cardinality [UserRole] =Cardinality [User]*Cardinality [Role]

RolePermission

Role Permission objects and database table serves as mapping between Role and Permission table. Data elements include Role Id and Permission Id.

Cardinality [RolePermission]=Cardinality [Role] *Cardinality [Permission]

RBAC SQL Queries

In order to check if a User u1 has Permission p1, we need to check all the Roles assigned to that user. If any of the Roles user belongs to, has the Permission p1, the User is then allowed to do the work/access the resource which requires Permission p1.

Complex SQL query with joins on multiple tables is fired to access if the User has any Role which has the required Permission. Following is such an SQL query:

```
SELECT * FROM Role Permission
    WHERE permission ID in
    (SELECT permission ID FROM Permission
        WHERE name = '<<permission>>')
    AND role ID IN
    (SELECT roleID FROM User Role
        WHERE user ID = '<<userId>>' )
```

Application Layers and RBAC

In another embodiment the MVC framework introduces the layers for Model View and Controller which serve for the Client side and Service and DAO layers work at the Server side. Role Based Access Control is additional layer which works between Client and Server layers in order to restrict the access of application resources to the Authorized Users only.

Figure 7:
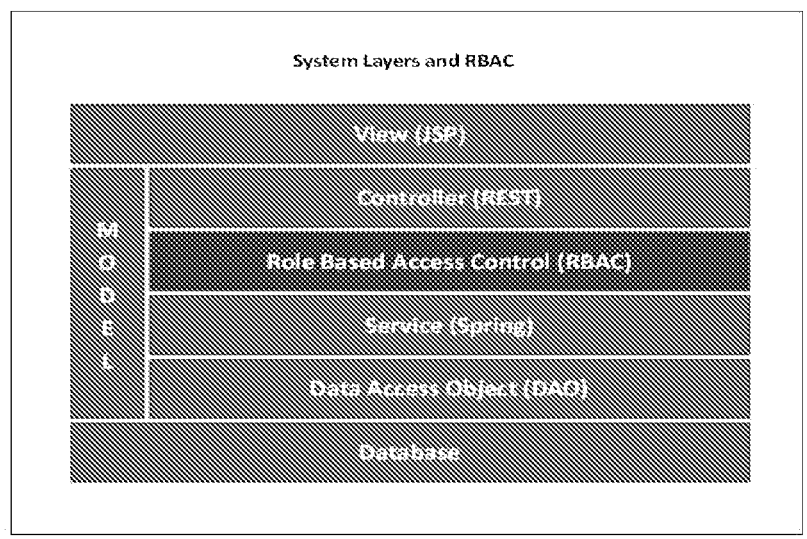
FIG. 7 illustrates Literature Survey on Application Layers and RBAC in accordance with the present invention.

As depicted in the FIG. 7, Role Based Access Control (RBAC) works as a Filtering Layer or Firewall between Controller and Service layers and serves the purpose of controlling the Access. RBAC Filter restricts the User to access the content which is not permitted at his/her role.

Challenges with Present RBAC Approaches

On every operation by every user, either a very complex nested query or multiple simple database queries are fired to identify if the user has appropriate rights to perform the task.

Sometimes the time taken to check permission is more than time taken to perform required operation.

Matching Standards

Requirements for Role Based Access Control have been collected, consolidated and standardized by various universities and organizations.

Performance

Before performing every Action, server needs to check for permission i.e. roughly every Action done by server. Nested SQL queries are fired while checking Role based permission from database which consumes CPU on database side.

Approximately 20% to 50% server time is consumed in checking the RBAC permissions.

Configurability

Traditional RBAC is adopted by industry because of its configurability. Users, Roles and Permissions can always be added, modified, reviewed and deleted by Admin users. New users can be added, disabled and removed without restarting the server application.

Scalability

Multi level hierarchies of Roles are created and successfully managed for hundreds of Roles and thousands of Users by traditional RBAC applications. Several studies are being done to support new requirements e.g. policy based access control on location, time and so many other dynamic attributes.

Pluggability

Irrespective to the size of application, it should be easy to integrate RBAC into any existing application. Adding new entities into the system requires new set of permissions to be defined on a per Entity basis. There is a requirement to ease defining the permissions for new entities.

Binary RBAC Concept

Binary arithmetic is known for vast in scalability, smallest in memory and fastest in speed. BRBAC uses separate bits to store permissions on User, Entity and Operation level. Permission bits of User, Operation and Entity are bitwise ANDed together to see if the operation is allowed or denied for the user.

Intersection of Permissions

Figure 8:
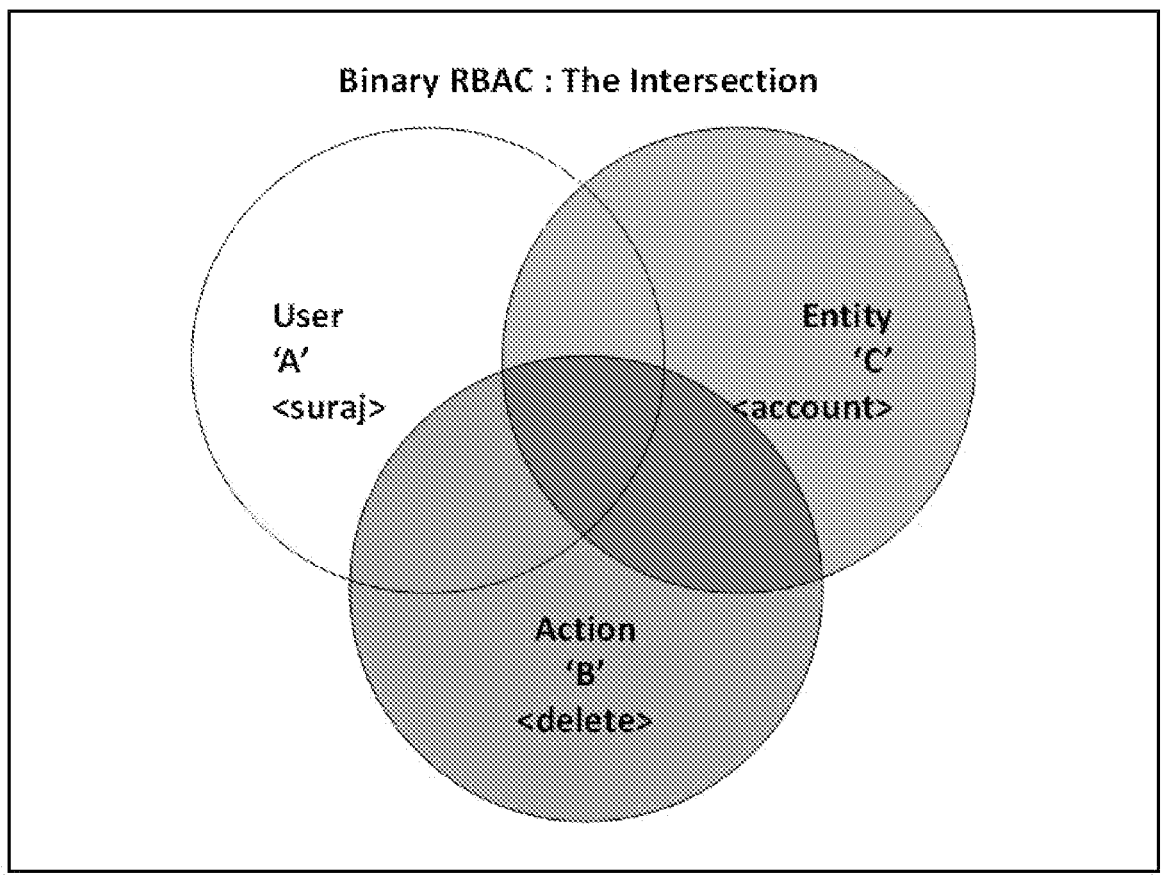
FIG. 8 illustrates Binary RBAC Concept on Binary RBAC: The Intersection in accordance with the present invention.

As shown in FIG. 8, BRBAC finds out the combination where User 'A' (suraj) has sufficient permissions to perform Operation 'B' (delete) on Entity 'C' (account). If such a combination exists, permission is granted; otherwise, permission is denied.

In general, there are so many Users, so many Entities and a number of available Actions for each Entity and each User; but a combination of ALL 3 of them, makes the attempt successful and absence of such combination meets a failure.

Implementation and Testing

Maximum work in this project is done using Open Source technologies including Ubuntu Linux, Postgresql database, Java, Eclipse IDE, Maven build tool, Jetty server, Dia, Spring services, Spring REST, Hibernate, Bootstrap, Selenium, JFreeChart, Log4J etc.

Implementation (Web Application)

This application has implemented both, Traditional and Binary RBAC. On every Action by every User, both Traditional and Binary methods are used to check for the permission and if permission is granted by both the methods, the Action is performed. Application precisely logs time consumed for all the steps i.e. time consumed in checking BRBAC permission, time consumed in checking Traditional permission and time consumed in performing the Action.

Figure 9:
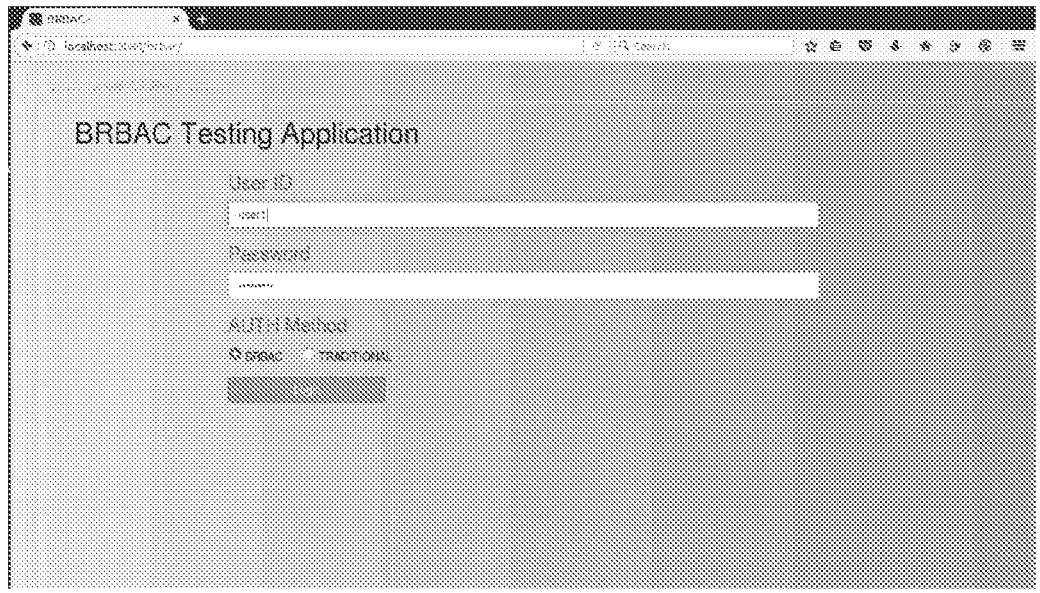
FIG. 9 illustrates Implementation and Testing on Login Page in accordance with the present invention.
Figure 10:
FIG. 10 illustrates Implementation and Testing on 100 Entities in accordance with the present invention.

This is MVC (Model, View, Controller) architecture based CRUD (Create, Read, Update, Delete) application which includes 100 Entities and 100 Users where permissions for each Entity and each User can be configured separately. This component is built using Spring 4.0, Hibernate 4.0, includes 883 Java classes including REST Controllers, Service Interfaces, Service implementations, DAO Interfaces, DAO Implementations etc. 666 JSP pages and 214 database tables. Application server Jetty 9.0 is used to deploy the application. Following figure depicts the login page of web application as depicted in FIG. 9:

The User home page which enlists all the Entities (out of 100) on which the logged in User has some access is shown in FIG. 10.

Figure 11:
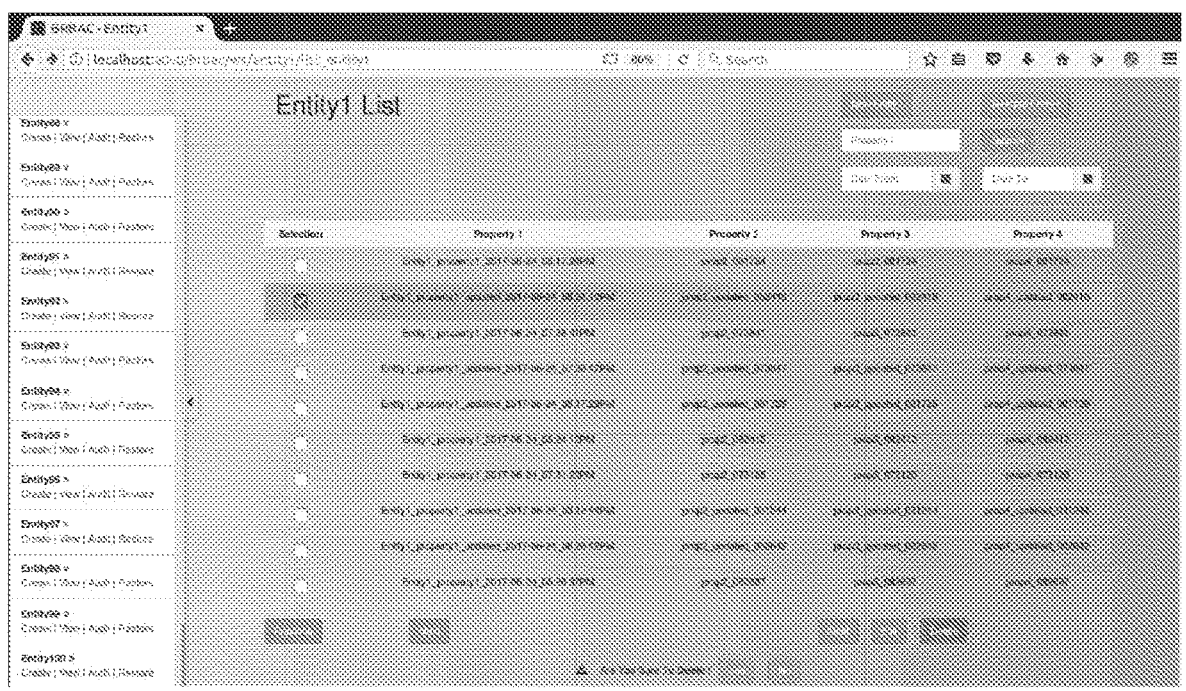
FIG. 11 illustrates Implementation and Testing on Entity Wise Lists in accordance with the present invention.

FIG. 11, shows the GUI page lists the data present in the database for particular Entity. This page provides all 4 Actions i.e. Create, Read, Update and Delete to the User by clicking on appropriate buttons.

Checking TRADITIONAL Permission

Five different tables namely User, Role, Permission, User-Role and Role-Permission are used to store traditional permissions. Users have mappings for Roles and Roles have mappings for Permissions. Thus a User has Roles and every Role has Permissions.

Following SQL query is used to check Traditional permissions:

```
SELECT * FROM RolePermission
WHERE permissionId IN
(SELECT permissionId FROM Permission
WHERE name = '<<permission>>')
AND roleId IN
(SELECT roleId FROM UserRole
WHERE userId = '<<userid>>')
```

This query checks if the required permission is configured in any of the Roles of the User. This is a nested query with minimum execution time of 6 milliseconds and average execution time of 12 milliseconds.

SQL queries are fired to check permission on per User per and Action basis. This is not easy be cached because if 100 Users perform Create, Read, Update and Delete on 10 Entities:

100 Users*4 Actions*10 Entities=4000 Permission Checks 4000 separate Actions shall be attempted where the combination for User, Role, and Permission is unique every time the query is fired.

Checking BRBAC Permission

In most enterprise web applications, controllers are used to check login and check access permissions. This Base Controller is the base class of all Controllers which defines the check Permission method. This check Permission( ) method need to be invoked from all controller methods. Aspect pointcuts can also be used to make a call to check Permission method.

TABLE

Implementation and Testing.1 Java code for checking Binary RBAC permissions

```java
public boolean checkPermission(Class<? extends Model> entity, CrudAction action, User user) {
  // Get permissions on Entity
  long entityMask = getEntityPermission(entity, user);
  // Get permissions for User
  long userPerm = user.getBrbacPermission( ).longValue( );
  // Get permissions required to perform this Action
  long actionMask = action.getMask( );
  // Binary AND the 3 masks
  long result = entityMask & userPerm & actionMask;
  // Done. If result is non-zero, user has the permission
  if (result > 0) {
  return true;
  } else {
    throw new RuntimeException("Insufficient privileges to perform this operation.");
}
```

BRBAC Class Permission Map

For above getEntityPermission( ) call, earlier we were using the Java's HashMap implementation to store and select the permissions for every Entity, the HashMap.get(entityId) method was consuming ~3 milliseconds (3000 microseconds) for every permission check. Hence, we replaced the Map by our own implementation BrbacClassPermissionMap which relies on primitive arrays and takes 0 microseconds in BrbacClassPermissionMap.get(entityId).

TABLE

Implementation and Testing.2 Java source for Class Permission Map

```java
@SuppressWarnings("rawtypes")
public class BrbacClassPermissionMap {
  public static final int NO_PERMISSION = 0;
  public static final int DEFAULT_PERMISSION = -1;
  private int[ ] classIds;
  private long[ ] permissions;
  private int length;
  public BrbacClassPermissionMap(int size) {
    this.classIds = new int [size];
    this.permissions = new long[size];
    this.length = 0;
  }
  public final long getPermission(Class clazz) {
    int hashcode = clazz.hashCode( );
    for (int i=0; i<length; i++){
      if(classIds[i] == hashcode){
        return permissions[i];
      }
    }
    return DEFAULT_PERMISSION;
  }
  public synchronized final void setPermission(Class clazz, long permission) {
    if(isPresent(clazz)){
      setPermissionForExistingClass(clazz, permission);
    } else {
      setPermissionForNewClass(clazz, permission);
    }
  }
  private boolean isPresent(Class clazz) {
    int hashcode = clazz.hashCode( );
    for(int i=0; i<length; i++){
      if(classIds[i] == hashcode){
        return true;
      }
    }
    return false;
  }
  private void setPermissionForExistingClass(Class clazz, long permission) {
    int hashcode = clazz.hashCode( );
    for(int i=0; i<length; i++){
      if(classIds[i] == hashcode){
        permissions[i] = permission;
      }
    }
  }
  private void setPermissionForNewClass(Class clazz, long permission) {
    ensureCapacity( );
    this.classIds[length] = clazz.hashCode( );
    this.permissions[length] = permission;
```

TABLE-continued

Implementation and Testing.2 Java source for Class Permission Map

```
    length++;
  }
  private void ensureCapacity( ) {
    if(length >= classIds.length) {
      int[ ] newClassIds = new int[classIds.length * 2];
      long[ ] newPermissions = new long[permissions.length * 2];
      System.arraycopy(classIds, 0, newClassIds, 0, length);
      System.arraycopy(permissions, 0, newPermissions, 0, length);
      this.classIds = newClassIds;
      this.permissions = newPermissions;
    }
  }
}
```

CRUD Action

Following class is used to store the permission bits on per Action basis:

TABLE

Implementation and Testing 3 Java source for CRUD Action class

```
public enum CrudAction {
  CREATE  (0x8888888888888888L),
  READ    (0x4444444444444444L),
  UPDATE  (0x2222222222222222L),
  DELETE  (0x1111111111111111L),
  AUDIT   (0x1111111111111111L),
  DISABLED (0x0000000000000000L);
    private final long mask;
    CrudAction(long mask){
      this.mask = mask;
    }
    public long getMask( ) {
      return mask;
    }
    public static CrudAction get(String straction) {
      if(straction == null){
        return DISABLED;
      }
      switch(straction.toUpperCase( )) {
      case "CREATE" :
```

TABLE-continued

Implementation and Testing 3 Java source for CRUD Action class

```
        return CREATE;
      case "READ" :
        return READ;
      case "UPDATE" :
        return UPDATE;
      case "DELETE" :
        return DELETE;
      case "AUDIT" :
        return AUDIT;
      case "DISABLED" :
      default :
        return DISABLED;
      }
    }
}
```

Selenium Client

Selenium based client application is developed for testing the main MVC CRUD application. This component automatically performs web based Login and attempts Create, Read, Update and Delete Actions on multiple Entities for multiple Users.

Full source code cannot be included in this report but the main excerpts are as following:

TABLE

Implementation and Testing.4 Java source for Selenium client application

```
public class BrbacSeleniumTest {
  static int COUNT_USER = 100;
  static int COUNT_ENTITY = 10;
  static int STEP_SLEEP_TIME = 500;
  static SimpleDateFormat sdf1 = new SimpleDateFormat("yyyy-MM-dd_hh.mm.ssa");
  static SimpleDateFormat sdf2 = new SimpleDateFormat("hhmmss");
  static String BASE_URL = "http://localhost:8080/brbac";
  static String[ ] authMethods = {"TRADITIONAL", "BRBAC"};
  public static void main(String[ ] args) {
    for(int userNum=1; userNum<=COUNT_USER; userNum++){
      try{
        BrbacSeleniumTest test = new BrbacSeleniumTest( );
        test.runUser(userNum);
      } catch(Exception ex) {
        System.out.println("Ignored Exception: "+ex);
      }
    }
    System.out.println("Selenium test completed.");
  }
  private void runUser(int userNum) {
    WebDriver driver = null;
    try {
        System.setProperty("webdriver.firefox.marionette",
          "/mnt/data/setups/geckodriver");
        driver = new FirefoxDriver( );
```

| TABLE-continued |
| --- |
| Implementation and Testing.4 Java source for Selenium client application |

```
    login(driver, userNum, authMethods[userNum % 2]);
    sleep(STEP_SLEEP_TIME * 3);
    System.out.println("Login : " + userNum);
    for(int entityNum=0; entityNum<COUNT_ENTITY; entityNum++){
        int actualEntityNum = entityNum * 10 + 5;
            System.out.println("Started testing user : " +
            (userNum)+", entity : "+(actualEntityNum));
        try{
           readEntityList(driver, actualEntityNum);
           sleep(STEP_SLEEP_TIME * 3);
        } catch(Exception ex){
           System.out.println("Exception while testing: "+ex);
        }
        try{
           createEntity(driver, actualEntityNum);
           sleep(STEP_SLEEP_TIME);
        } catch(Exception ex){
           System.out.println("Exception while testing: "+ex);
        }
        try{
           updateEntity(driver, actualEntityNum);
           sleep(STEP_SLEEP_TIME);
        } catch(Exception ex){
           System.out.println("Exception while testing: "+ex);
        }
        try{
           deleteEntity(driver, actualEntityNum);
           sleep(STEP_SLEEP_TIME);
        } catch(Exception ex){
           System.out.println("Exception while testing: "+ex);
        }
            System.out.println("Done testing for user :" +
            (userNum)+", entity : "+(actualEntityNum));
       }
    }
    catch(Exception ex2) {
       System.out.println("Exception on browser: "+ex2);
    }
    finally {
       System.out.println("Done testing for user : " + (userNum));
       if(driver != null){
          driver.close( );
private void create Entity(Web Driver driver, int i) {
       driver.findElement(By.xpath("//a[@href='"+BASE_URL+"ws/entity"+i+
       "/create_entity"+i+"']")).click( );
    sleep(STEP_SLEEP_TIME);
    Date date = new Date( );
       driver.findElement(By.id("property1")).sendKeys("Entity"+i+"_propert
       y1_"+sdf1.format(date));
driver.findElement(By.id("property2")).sendKeys("prop2_"+sdf2.format(date));
driver.findElement(By.id("property3")).sendKeys("prop3_"+sdf2.format(date));
driver.findElement(By.id("property4")).sendKeys("prop4_"+sd/2.format(date));
    driver.findElement(By.xpath("//input[@type='submit']")).click( );
}
private void delete Entity(Web Driver driver, int i) {
    // Go to list first
    driver.navigate( ).to(BASE_URL+"/ws/entity"+i+"/list_entity"+i);
    sleep(STEP_SLEEP_TIME);
    driver.findElement(By.xpath("//input[@type='checkbox']")).click( );
    driver.findElement(By.id("deleteBtn")).click( );
    sleep(STEP_SLEEP_TIME / 2);
    driver.findElement(By.id("confirmyesBtn")).click( );
    driver.findElement(By.xpath("//input[@type='submit']")).click( );
  }
}
```

Multi Scaled Graph Plotter

As the range of results was from 1 to 100000 and there was a unique need to plot 0-10 microseconds and 10,000-100,000 microseconds in the same graph, plotting the detailed line graphs from raw data required creating a new Java application which plots uniquely designed Multi Scaled Graphs using JFreeChart API.

JFreeChart API into a Core Java application (the Graph Plotting Application) was used to compute and render these graphs. Value for Y AXIS is scaled appropriately for its pixel position before it is plotted. The Y AXIS in these unique kind of graphs is divided in 5 different scales (the dashed lines) which are 0-10 microseconds, 10-100 microseconds, 100-1000 microseconds, 1000-10,000 microseconds and 10,000-100,000 microseconds i.e. on every step, the scale is being multiplied by 10 times. The X AXIS is regular and has no modifications.

Full source code for the application cannot be included in this document; following snippet displays the drawing and value scaling part of the application:

Table Implementation and Testing.5 Source Code for Graph Plotter

```
private int width = 2500;
private int height = 1350;
private int scaleWidth = 2200;
private int scaleHeight = 200;
private int scaleMin[ ] = {0,10,100,1000,10000};
private int scaleMax[ ] = {10,100,1000,10000,100000};
private void drawLineChart(Graphics2D g, int[ ] values, Color color) {
   int[ ] xPoints = new int[values.length];
   int[ ] yPoints = new int[values.length];
   for(int i=0; i<values.length; i++){
      yPoints[i] = g etScaledYPosition(values[i]);
      xPoints[i] = scaleWidth * i / values.length + seed;
   }
   g.setColor(color);
   g.setStroke(new BasicStroke(STROKE_SIZE));
   g.drawPolyline(xPoints, yPoints, values.length);
}
private int getScaledYPosition(int value){
   int high=0;
   for(; high<scaleMax.length; high++){
      if(value < scaleMax[high]){
         break;
      }
   }
   if(high==scaleMax.length){
      high = scaleMax.length-1;
   }
   int ypos = 0;
   if(value >= scaleMax[high]){
      ypos = scaleMax[high] - scaleMin [high];
   } else {
      ypos = value - scaleMin[high];
   }
   ypos = scaleHeight * ypos / (scaleMax[high] - scaleMin[high]);
   ypos = ypos + seed + scaleHeight * high;
   return ypos;
}
```

Figure 12:
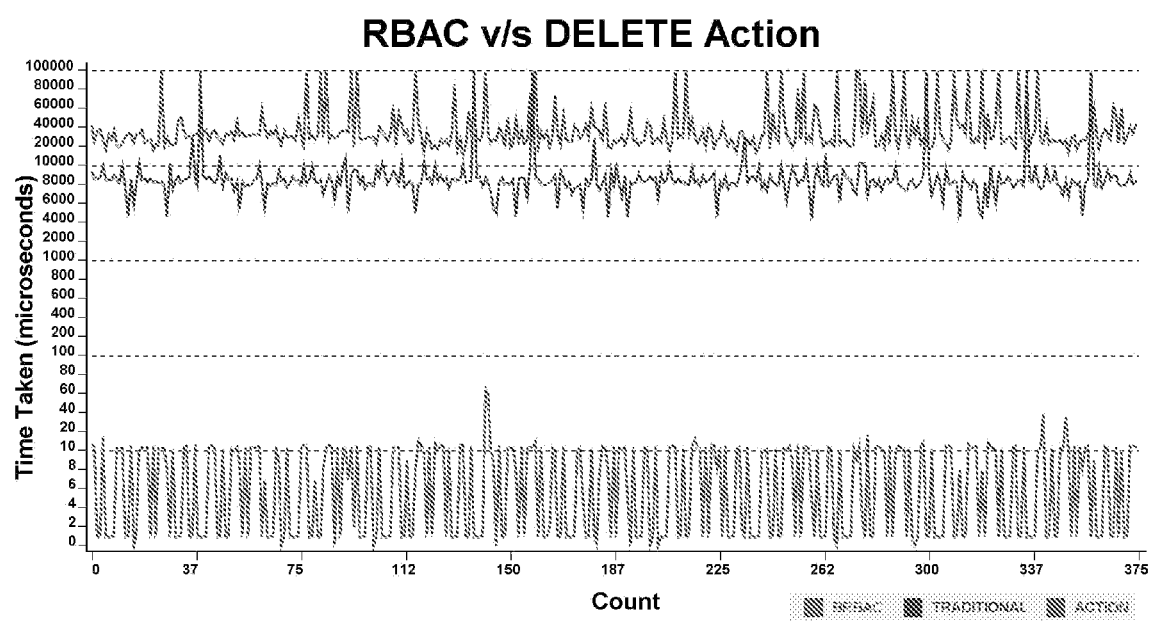
FIG. 12 illustrates implementation and Testing on Example Multi Scaled Graph in accordance with the present invention.

FIG. 12 is an example of a Multi Scaled Graph which has 5 different scales as described above:

Testing

Rigorous testing has been done to prove the concepts and derive the conclusions. The main challenge was the requirement to support all the features which are generally available with traditional implementations.

Test Environment: HP ProBook 4540s, Intel Core i5 2.5 GHz, 4.0 GB RAM, Ubuntu Linux 16.04 (64 bit) operating system Functional Testing As described in the Implementation section above, the testing application contains both Binary and Traditional RBAC implementations. Application contains 100 different Entities with their corresponding 100 database tables. Users were configured with Roles having different permissions based on Entity identifiers such that, Binary and Traditional permissions were identical for each User.

Application was tested to attempt all Actions i.e. Create, Read, Update and Delete by all 100 Users on all 100 Entities. Following are the functional test results:

All the cases where permission was GRANTED by Traditional RBAC, Permission was also GRANTED by Binary RBAC without any fail All the cases where permission was DENIED by Traditional RBAC, Permission was also DENIED by Binary RBAC without any fail Performance Testing Reference application was coded to invoke both Binary RBAC and Traditional RBAC one after another in order to compare equality of results and time consumed while checking the permissions. Time consumption was logged in microseconds after every call to check Binary RBAC permission, check Traditional RBAC permission and performing the Action.

The aforementioned Selenium client application was run overnight to capture performance stats in the log file. Numbers from the log file were extracted and aggregated using Spreadsheets and Linux commands, converted in the form of graphs and presented in the following sections.

Results Analysis

Aggregated Test Results

Figure 13:
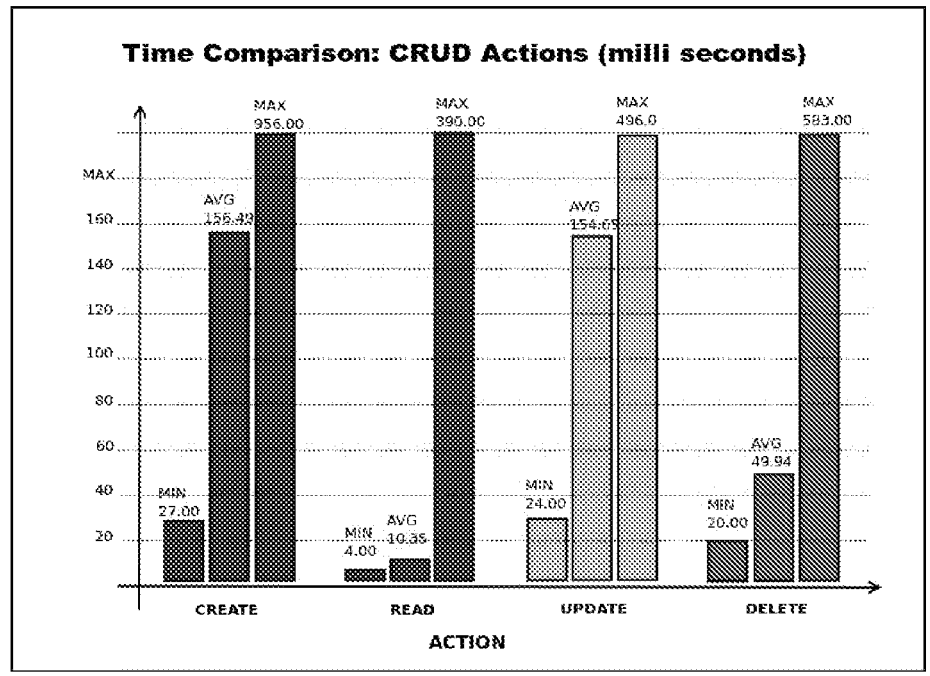
FIG. 13 illustrates Results Analysis on Time comparison; CRUD Actions in accordance with the present invention.

Aggregated time consumption results are shown in the following sub sections: CRUD Action vise Time Consumption Different SQL queries are executed by Create, Read, Update and Delete actions on Database. Every kind of query takes different time in execution. Following chart compares time consumed by Create, Read, Update and Delete actions in milliseconds, as shown in FIG. 13.

|  | Number of | TIME in milliseconds | | |
| --- | --- | --- | --- | --- |
| ACTION | Samples | MIN | AVG | MAX |
| CREATE | 825 | 27.00 | 156.49 | 956.00 |
| READ | 3000 | 4.00 | 10.35 | 390.00 |
| UPDATE | 575 | 24.00 | 154.65 | 496.00 |
| DELETE | 400 | 20.00 | 49.94 | 583.00 |

As depicted above, minimum and average time taken by Create and Delete actions is almost equal. Read is always faster than Create because no mutation is done in the Select commands. Create and Update action takes more time than other actions. Refer section "Appendix A" and "Appendix B" for more details.

This study of actions will help in further comparing the time consumed in performing user Action (Work) versus time consumed in the ceremonial RBAC permission checks.

Traditional Versus Binary RBAC

Figure 14:
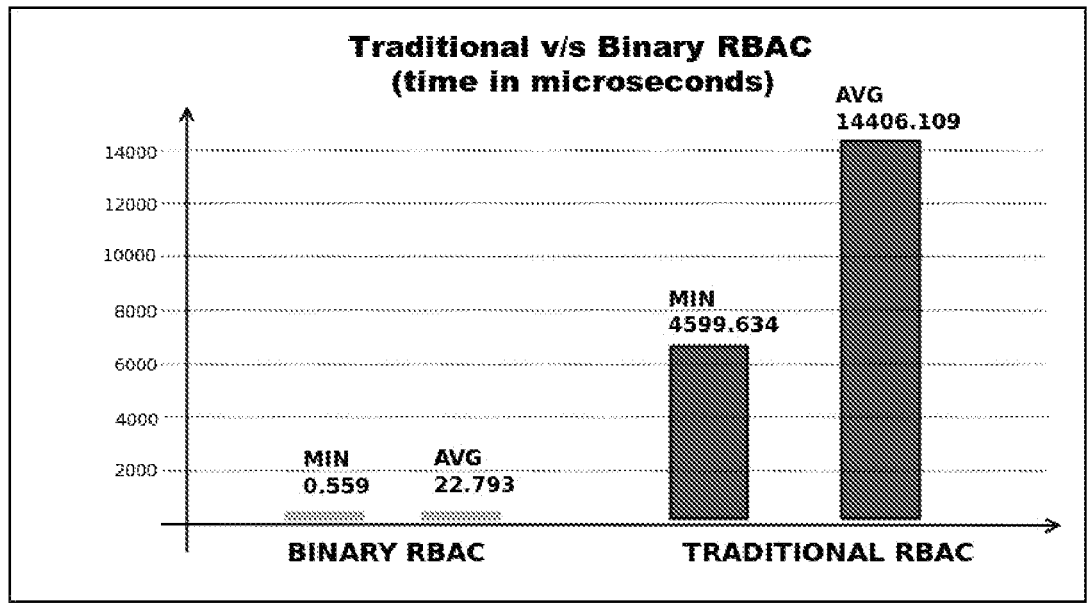
FIG. 14 illustrates Results Analysis on Traditional versus Binary RBAC in accordance with the present invention.

Time consumption stats obtained from the test results were compared to find out the difference in performance of Binary versus Traditional RBAC approach, and in illustrated in FIG. 14.

Time Unit: 1 microsecond=10-6 seconds=0.000001 seconds

|  | Number of | Time in microseconds | | |
| --- | --- | --- | --- | --- |
| Method | Samples | MIN | AVG | MAX |
| TRADITIONAL RBAC | 6951 | 4599.634 | 14406.109 | 4200330.977 |
| BINARY RBAC | 6951 | 0.559 | 22.793 | 19217.411 |

It's been observed that, on an average Traditional RBAC takes 14 milliseconds or 14406 microseconds to check for the permissions. Similar work was done by reference implementation of Binary RBAC in 0.0227 milliseconds or 22.7 microseconds. Refer section "Appendix A" and "Appendix B" for further details.

Benefit in Performance=14406/22.79=632.11 Times

Cumulated Test Results

Aforementioned test results were summed up together in order to find out the overall performance gain after integrating Binary RBAC into the system.

RBAC Versus CRUD Actions

Figure 15:
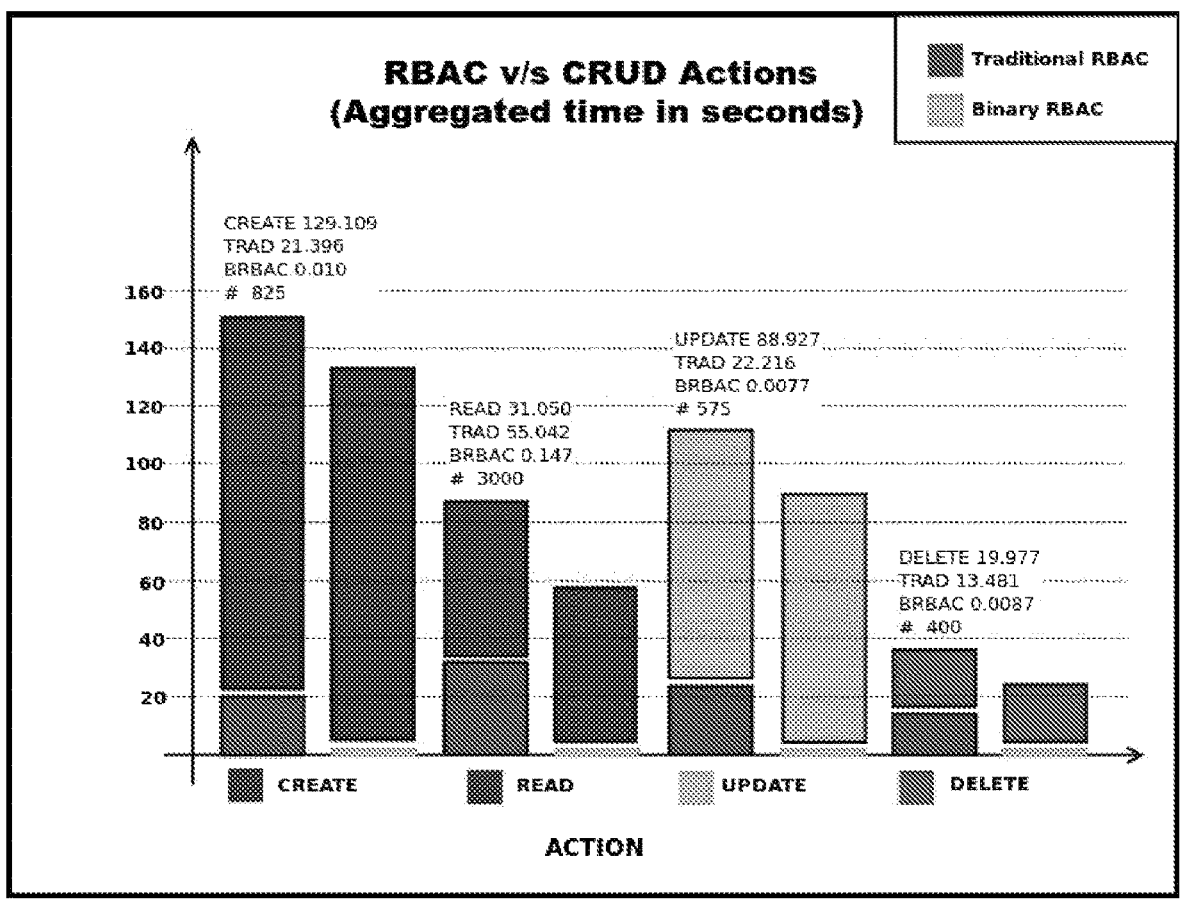
FIG. 15 illustrates Results Analysis on RBAC versus CRUD Actions in accordance with the present invention.

The chart depicted in FIG. 15, compares cumulated time consumed in Create, Read, Update, Delete actions and checking permissions before performing the Action.

Time Unit: Seconds

Time Unit in data sheet: 1 microsecond=10-6 seconds=0.000001 seconds

|  | WORK | | TRADITIONAL | | BRBAC | |
| --- | --- | --- | --- | --- | --- | --- |
| ACTION | COUNT | SUM | COUNT | SUM | COUNT | SUM |
| CREATE | 825 | 129109000 | 1825 | 21396140.775 | 1825 | 10281.715 |
| READ | 3000 | 31050000 | 3788 | 55042011.201 | 3788 | 147521.391 |
| UPDATE | 575 | 88927000 | 1400 | 22216166.517 | 1400 | 7715.173 |
| DELETE | 400 | 19977000 | 825 | 13481919.809 | 825 | 8732.171 |
| TOTAL | 4800 | 269063000 | 7838 | 112136238.302 | 7838 | 174250.45 |

Selenium test included 825 Create, 3000 Read, 575 Update and 400 Delete Actions performed on various Entities. Time consumed in all Actions was summed to get the cumulated results.

This is evident from the chart that, since the Read operation takes lesser time to complete, checking Traditional permissions was more costly than actually performing the Read operations.

Number of times the permissions checked is more than number of times the Actions are performed in all the cases. This is because permissions are checked before displaying the options to perform Action and check permissions were also attempted when permissions were not granted.

Create: Total time taken by 825 Create operations was 129109000 microseconds i.e. 129.109000 seconds. Checking Create Entity permissions by Traditional method for 1825 times took 21396140.775 microseconds i.e. 21.396 seconds. And Checking Create Entity permissions by Binary method for 1825 times took 10281.715 microseconds i.e. 0.010 seconds.

Read: Total time taken by 3000 Read operations was 31050000 microseconds i.e. 31.05 seconds. Checking Read Entity permissions by Traditional method for 3788 times took 55042011.201 microseconds i.e. 55.04 seconds. And Checking Read Entity permissions by Binary method for 3788 times took 147521.391 microseconds i.e. 0.14 seconds.

Update: Total time taken by 575 Update operations was 88927000 microseconds i.e. 88.92 seconds. Checking Update Entity permissions by Traditional method for 1400 times took 22216166.517 microseconds i.e. 22.21 seconds. And Checking Update Entity permissions by Binary method for 1400 times took 7715.173 microseconds i.e. 0.007715 seconds.

Delete: Total time taken by 400 Delete operations was 19977000 microseconds i.e. 19.97 seconds. Checking Delete Entity permissions by Traditional method for 825 times took 13481919.809 microseconds i.e. 13.481 seconds. And Checking Delete Entity permissions by Binary method for 825 times took 8732.171 microseconds i.e. 0.008732 seconds.

Cumulated Work Versus RBAC

Figure 16:
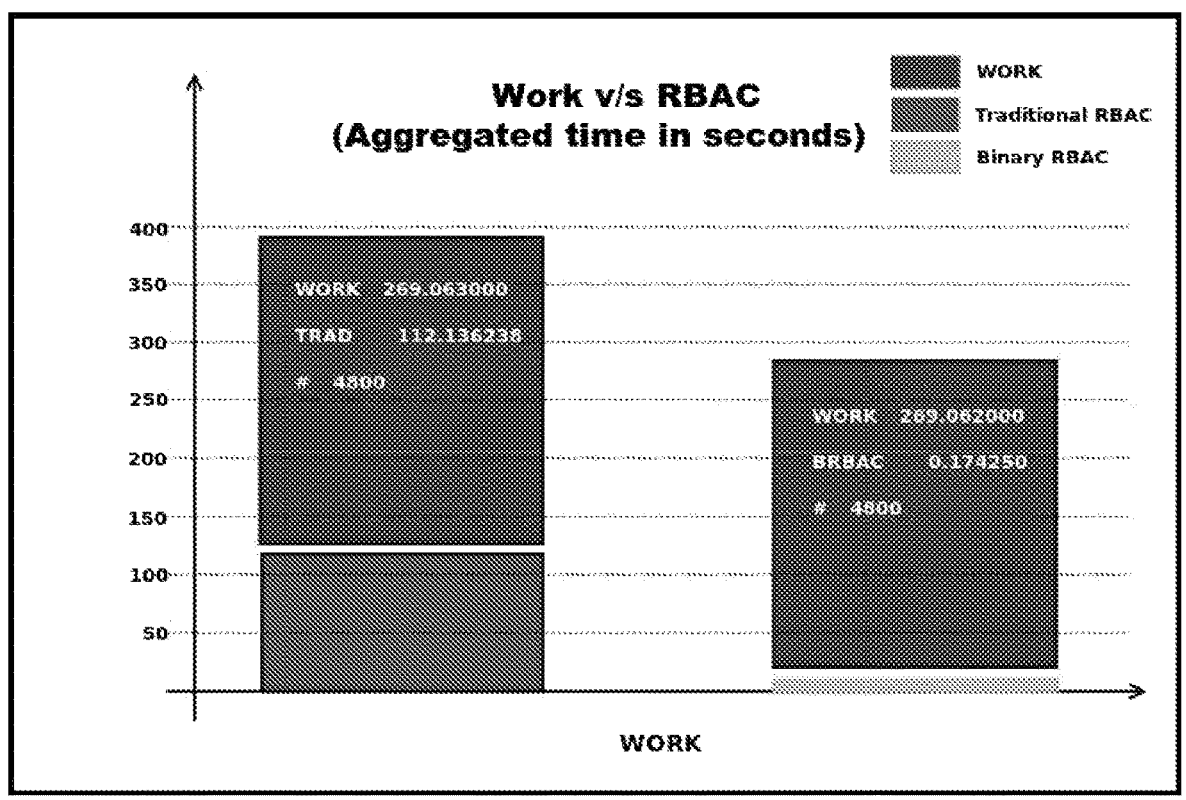
FIG. 16 illustrates Results Analysis on Work versus RBAC Time Consumption in accordance with the present invention.

Time taken to perform all 4800 Actions is summed together to get the total Work done by the application. Time taken to check all the 7838 permissions is summed together to get the total time consumed by RBAC. On comparing both the stats, we get the final result as depicted in FIG. 16.

Following is the data sheet for cumulated time consumption:

Time Unit in data sheet: 1 microsecond=10-6 seconds=0.000001 seconds

|  | WORK | | TRADITIONAL | | BRBAC | |
| --- | --- | --- | --- | --- | --- | --- |
| ACTION | COUNT | SUM | COUNT | SUM | COUNT | SUM |
| CREATE | 825 | 129109 | 1825 | 21396140.775 | 1825 | 10281.715 |
| READ | 3000 | 31050 | 3788 | 55042011.201 | 3788 | 147521.391 |
| UPDATE | 575 | 88927 | 1400 | 22216166.517 | 1400 | 7715.173 |
| DELETE | 400 | 19977 | 825 | 13481919.809 | 825 | 8732.171 |
| TOTAL | 4800 | 269063 | 7838 | 112136238.302 | 7838 | 174250.45 |

As shown in the above chart and data sheet, total time taken to perform 4800 actions is 269063000 microseconds i.e. 269 seconds. Total time consumed in checking permissions 7838 times by Traditional RBAC method is 112136238 microseconds i.e. 112 seconds. And total time consumed in checking permissions 7838 times by Binary RBAC method is 174250 microseconds i.e. nearly 0.17 seconds.

Comparing time consumption between Work and Traditional RBAC:

$$\text{Work } v/s \text{ Traditional } RBAC = 112136238/269063000$$
$$= 0.4167$$
$$= 41.67\%$$

This means, in our test, time consumption in checking Traditional RBAC permissions was 41% of time consumed in actual work.

$$\text{Working v/s Binary } RBAC = 74250/269063000$$
$$= 0.000647618$$
$$= 00.06\% \text{ or } 0.1\%$$

This means, in our test, time consumption in checking Binary RBAC permissions was 0.1% of time consumed in actual work.

Obtaining the Time Fraction of Traditional RBAC into the Application:

$$\text{Traditional } RBAC \text{ fraction} = 112136238/269063000 + 112136238$$
$$= 0.294167005$$
$$= 29.41\%$$

This means, in our test, overall 29% server time was consumed in checking Traditional RBAC permissions.

$$\text{Binary } RBAC \text{ fraction} = 174250/269063000 + 174250$$
$$= 0.000647199$$
$$= 00.06\%$$

This means, in our test, overall 0.06% server time was consumed in checking Binary RBAC permissions.

This result concludes that, replacing Traditional RBAC with Binary RBAC with correct implementation will increase the overall server performance by 25% to 50%.

Detailed Test Results

This section covers more granular comparison between Traditional and Binary RBAC methods and also their relation with Create, Read, Update and Delete Actions.

Traditional v/s Binary RBAC (Permission Granted)

Figure 17:
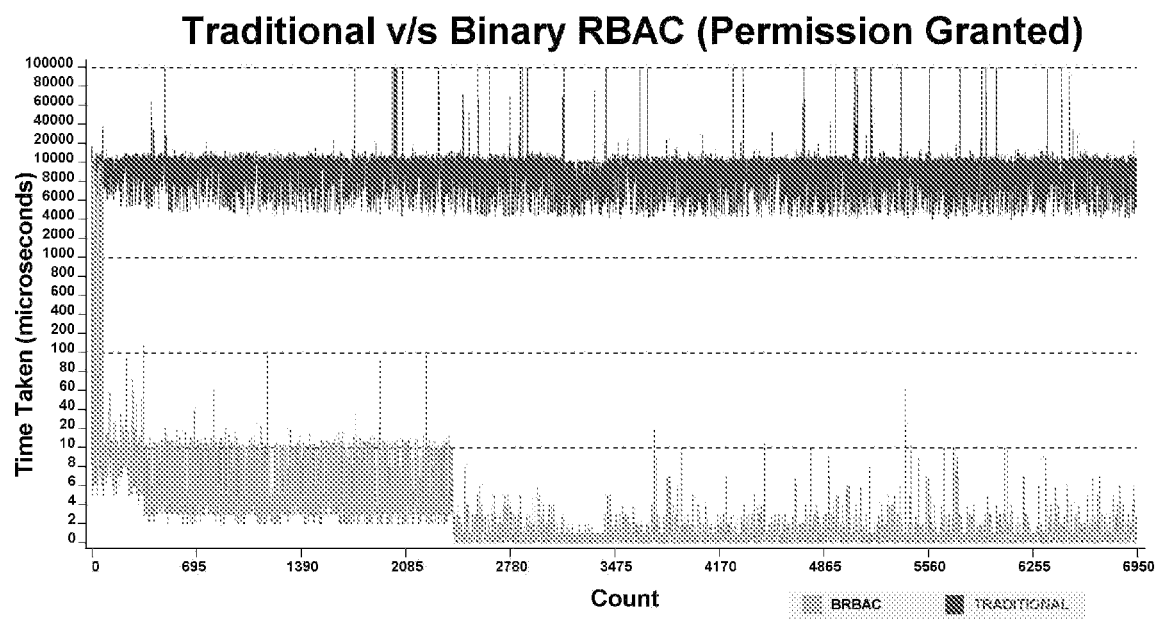
FIG. 17 illustrates Results Analysis on Traditional v/s Binary RBAC Permission Granted in accordance with the present invention.

The following Multi Scaled Graph plots 6950 cases of permission GRANTED in Traditional and Binary RBAC system. Where time consumed by traditional RBAC is printed as Dark and that by Binary RBAC is printed as Light as shown in FIG. 17.

Checking permissions with Traditional RBAC always takes 6 to 12 milliseconds i.e. 6000 to 12000 microseconds. Binary RBAC needs Entity permission mask to check for the permission. When Entity is not loaded, Binary RBAC takes up to 12000 microseconds because it reads Entity's permission mask from database. Once the Entity is loaded, Binary RBAC takes less than 10 microseconds to check for the permission. Please refer section "Appendix A" and "Appendix B" for further details.

It was observed that, once the server becomes stable and all the Entities are loaded, Binary RBAC takes 0 microseconds (500 nanoseconds) to check for the permission because BINARY AND operation does not take time.

Traditional v/s Binary RBAC (Permission Denied)

Figure 18:
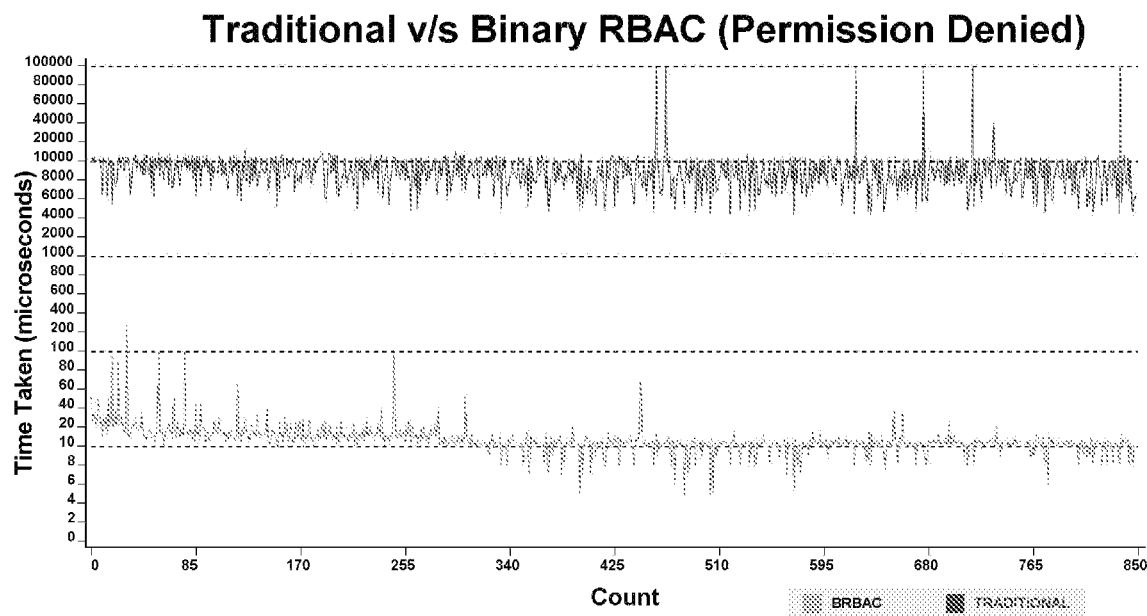
FIG. 18 illustrates Results Analysis on Traditional v/s Binary RBAC Permission Denied in accordance with the present invention.

The following Multi Scaled Graph plots 850 cases of permission DENIED in Traditional and Binary RBAC system. Where time consumed by traditional RBAC is printed as Dark and that by Binary RBAC is printed as light as shown in FIG. 18.

The reference implementation returns TRUE when permission is GRANTED and throws Runtime Exception when permission is DENIED. Throwing the exception takes some time (say, 8-10 microseconds) because 1 instance of java.lang.RuntimeException class is created. For this reason, in Binary RBAC, the time consumption gets increased by 8-10 microseconds when the permission is DENIED. Traditional RBAC takes equivalent time weather the permission is GRANTED or DENIED. Please refer section "Appendix A" and "Appendix B" for further details.

Traditional and Binary RBAC v/s CREATE Action

Figure 19:
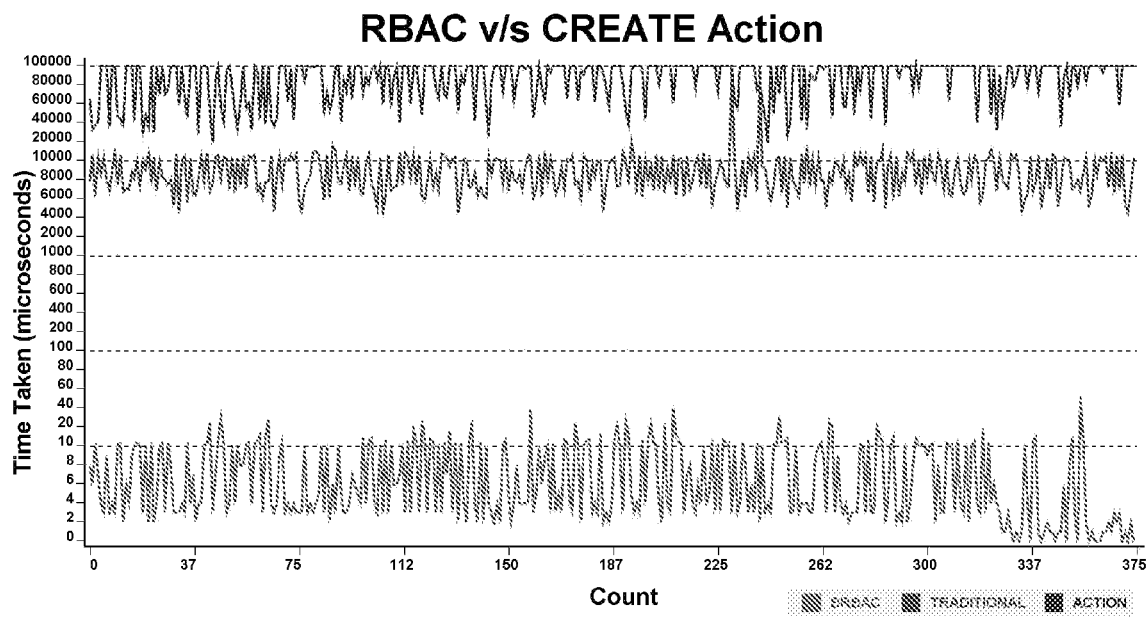
FIG. 19 illustrates Results Analysis on RBAC v/s CREATE Action in accordance with the present invention.

The following Multi Scaled Graph plots 375 cases for performance comparison between CREATE Action versus RBAC permission checked in Traditional and Binary RBAC system. Where time consumed by CREATE Action is printed at top, by traditional RBAC is printed at middle and by Binary RBAC is printed at bottom as shown in FIG. 19.

CREATE Action consumes 10 to 100 milliseconds i.e. 10,000 to 100,000 microseconds. This is evident from above graph that:

In all 375 cases, the time consumed by Traditional RBAC is comparable to the time consumed by Action.

In all 375 cases, the time consumed by binary RBAC is 100 to 1000 times less than the time consumed by Action i.e. the actual work done.

Traditional and Binary RBAC v/s READ Action

Figure 20:
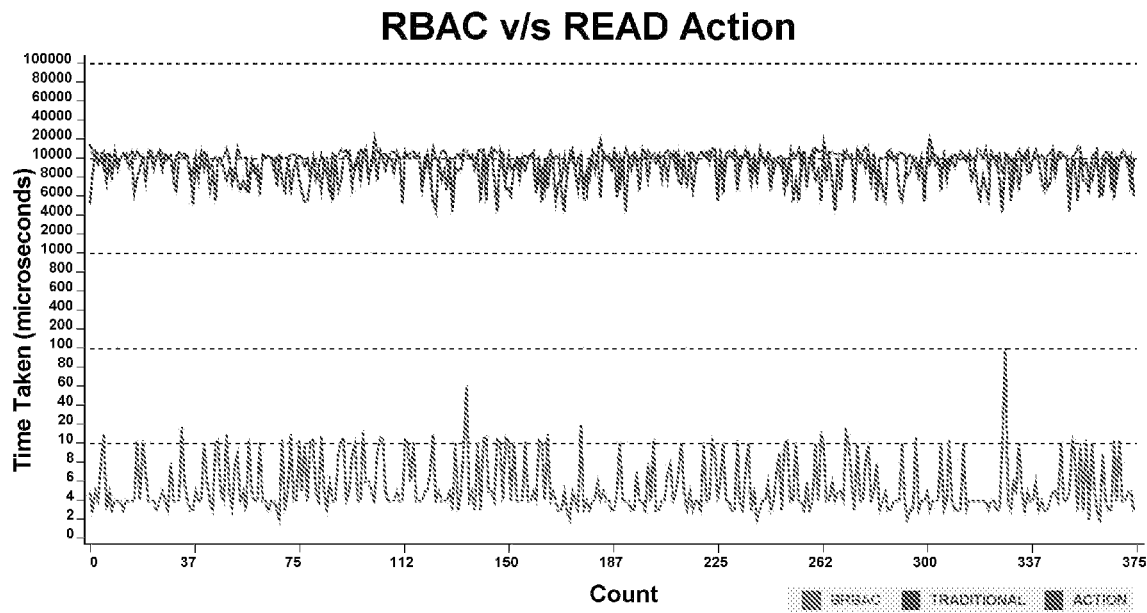
FIG. 20 illustrates Results Analysis on RBAC v/s READ Action in accordance with the present invention.

The following Multi Scaled Graph plots 375 cases for performance comparison between READ Action versus RBAC permission checked in Traditional and Binary RBAC system. Where time consumed by READ Action is printed as VIOLET, by traditional RBAC is printed as BROWN and by Binary RBAC is printed as GREEN as shown in FIG. 20.

READ Action consumes 4 to 10 milliseconds i.e. 4,000 to 10,000 microseconds. This is evident from above graph that:

In some cases, the time consumed by Traditional RBAC is more than the time consumed by Action.

In all 375 cases, the time consumed by binary RBAC is 100 to 1000 times less than the time consumed by Action i.e. the actual work done.

Traditional and Binary RBAC v/s UPDATE Action

Figure 21:
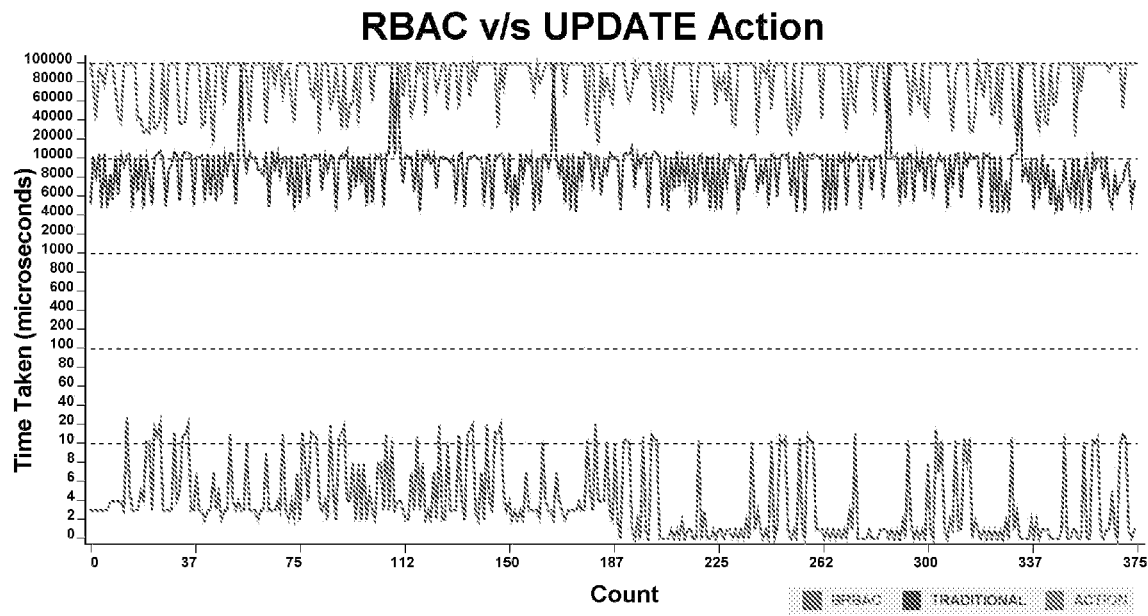
FIG. 21 illustrates Results Analysis on RBAC v/s UPDATE Action in accordance with the present invention.

The following Multi Scaled Graph plots 375 cases for performance comparison between UPDATE Action versus RBAC permission checked in Traditional and Binary RBAC system. Where time consumed by UPDATE Action is printed at top, by traditional RBAC is printed at middle and by Binary RBAC is printed at bottom as shown in FIG. 21.

UPDATE Action consumes 20 to 200 milliseconds i.e. 20,000 to 200,000 microseconds. This is evident from above graph that:

In all 375 cases, the time consumed by Traditional RBAC is comparable to the time consumed by Action.

In all 375 cases, the time consumed by binary RBAC is 100 to 1000 times less than the time consumed by Action i.e. the actual work done.

Traditional and Binary RBAC v/s DELETE Action

Figure 22:
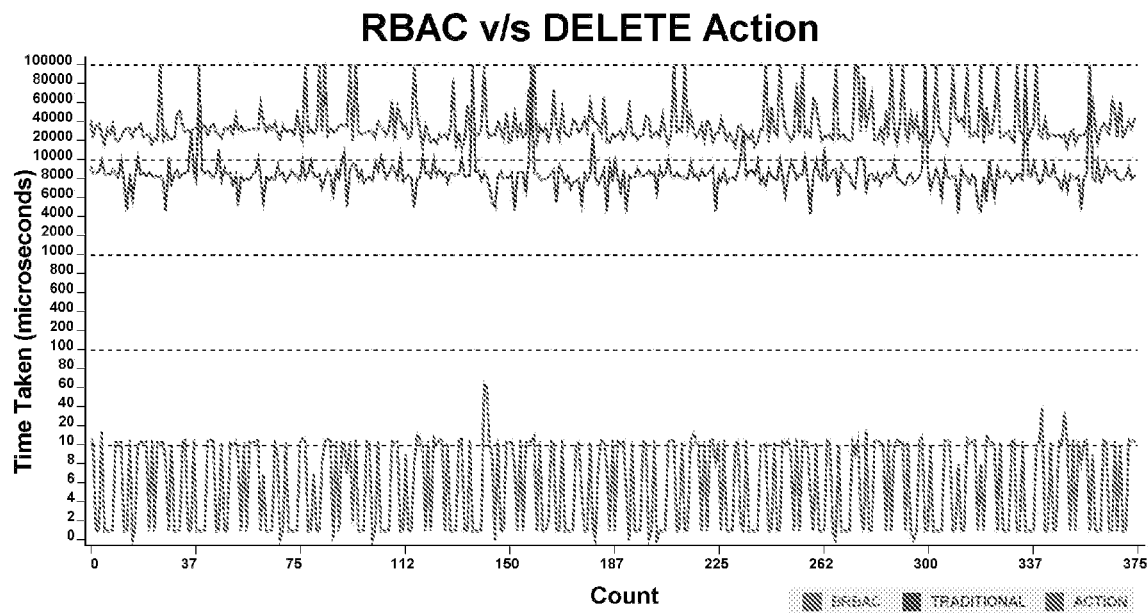
FIG. 22 illustrates Results Analysis on RBAC v/s DELETE Action in accordance with the present invention.

The following Multi Scaled Graph plots 375 cases for performance comparison between DELETE Action versus RBAC permission checked in Traditional and Binary RBAC system. Where time consumed by DELETE Action is printed at top, by traditional RBAC is printed at middle portion and by Binary RBAC is printed at bottom. As shown in FIG. 22.

DELETE Action consumes 10 to 100 milliseconds i.e. 10,000 to 100,000 microseconds. This is evident from above graph that:

In all 375 cases, the time consumed by Traditional RBAC is comparable to the time consumed by Action.

In all 375 cases, the time consumed by binary RBAC is 100 to 1000 times less than the time consumed by Action i.e. the actual work done.

Conclusion

It is observed that while working with Traditional RBAC, up to 29% of server time goes in to checking the User permissions.

Performance Gain

Replacing Traditional RBAC with Binary RBAC with correct implementation will increase the overall server performance by 29%.

Lightning Fast

It was observed that, Binary RBAC is 500 times faster than Traditional RBAC.

It was observed that, once the server becomes stable and all the Entities are loaded, Binary RBAC takes 0 microseconds (500 nanoseconds) to check for the permission because BINARY AND operation does not take time.

Actions Versus RBAC

Read Action is performed maximum times out of Create, Read, Update, Delete. If time consumed in Read can be improved, overall server performance will also improve.

For Create Action: Binary RBAC was 2080 times faster than Traditional RBAC.

For Read Action: Binary RBAC was 373 times faster than Traditional RBAC. This includes the time of first time loading the Entity permissions.

For Update Action: Binary RBAC was 2879 times faster than Traditional RBAC.

For Delete Action: Binary RBAC was 1543 times faster than Traditional RBAC. This includes maximum permission denials.

No Runtime Database Lookup

Binary RBAC does not require a database lookup for every permission check.

Runtime Memory

For 100 Users, 100 Entities and 4 Actions, cache for Binary RBAC permissions requires 204*8 bytes=only 1632 bytes or 2 KB of RAM.

Scalability

Increasing number of roles, number of entities, number of users, number of actions have nearly no performance impact on BRBAC.

Issues with Binary RBAC

Configuration

BRBAC is very complex to configure. Working carelessly with direct binary values might have severe security impacts.

Runtime Updates

BRBAC does not re-load permissions for Entity or User. But this can be very easily solved by adding suitable reload logic.

Example

Implementing Attribute Based Access Control (ABAC)

Attribute

Modern security systems consider multiple Attributes while controlling access e.g. Action (Create, Read, Update, Delete, Execute, Audit, Approve), User's Role(s), User's Current Location, User's Current Network Type (e.g. Home, Office, Cyber Cafe), User's Current Device Type (e.g. Laptop, Mobile), Day of week, Time of Day, Working Day or Holiday.

| Attribute Id | Name |
| --- | --- |
| 1 | Security Context (Department) |
| 2 | Role |
| 3 | Action |
| 4 | Resource |
| 5 | Location |
| 6 | Time of Day |
| 7 | Working Day or Holiday |
| 8 | Network Type |
| 9 | Device Type |
| . | ... |

Number of attributes can be added or removed as per policy requirements of the organization.

Security Context

There can be N Departments/Domains in an Organization. For each Department/Domain, access to the information need to be managed independently and securely.

| Context Id | Name |
| --- | --- |
| 1 | Dept1 |
| 2 | Dept2 |
| 3 | Dept3 |
| 4 | Dept4 |

Action

Multiple Actions can be performed on any data for example

Create/Read/Update/Delete/Execute/Audit/Approve/Custom

Each Action shall have independent Permission Bit for each Level of Information Security. Storing above 8 permissions will consume 8 bits as depicted in the table below.

| Create | Read | Update | Delete | Execute | Audit | Approve | Custom | 8 Bit Mask |
| --- | --- | --- | --- | --- | --- | --- | --- | --- |
| 1 | 1 | 1 | 1 | 1 | 1 | 1 | 1 | 11111111 |
| 1 | 1 | 1 | 1 | 1 | 0 | 0 | 0 | 11111000 |
| 1 | 1 | 1 | 0 | 0 | 0 | 0 | 0 | 11100000 |
| 0 | 1 | 0 | 0 | 0 | 0 | 0 | 0 | 01000000 |

Security Level

For each Department/Domain, there shall be exactly 1 Security Context having multiple Levels of information security for example Public/Low/Medium/High/Highest For a Security Context having 5 Levels of Information Security, the Permission Mask will contain 8×5=40 bits. If there are more levels, the mask will contain more bits.

Such a security mask shall be assigned to each Attribute in the system. For each attribute, bit size of the mask should be equal and the bit positions should be aligned with each other for a fast computation.

Role Mask

For each Security Context i.e. for each Department, there shall be N Roles defined.

Each Role has a binary Role Mask having different Permission Bits for each Action, for each Level of Information Security. This way, the role mask contains 40 bits for each role.

| Role | | | Security Mask | | | | |
|---|---|---|---|---|---|---|---|
| Role Id | Context Id | Name | Public | Low | Medium | High | Highest |
| 1 | 1 | Admin | 11111100 | 11111100 | 11111100 | 11111100 | 11111100 |
| 2 | 1 | Manager | 11111100 | 11111100 | 11111100 | 11111100 | 01000000 |
| 3 | 1 | Executive | 11111100 | 11111100 | 11111100 | 01000000 | 00000000 |
| 4 | 1 | Guest | 01000000 | 00000000 | 00000000 | 00000000 | 00000000 |
| 5 | 2 | Admin | 11111100 | 11111100 | 11111100 | 11111100 | 11111100 |
| 6 | 2 | Manager | 11111100 | 11111100 | 11111100 | 11111100 | 01000000 |
| 7 | 2 | Executive | 11111100 | 11111100 | 11111100 | 01000000 | 00000000 |
| 8 | 2 | Guest | 01000000 | 00000000 | 00000000 | 00000000 | 00000000 |

Action Mask

For each Security Context i.e. for each Department, there shall be 8 Actions defined.

Each Action has a binary Action Mask having different Permission Bits for each Action, for each Level of Information Security. This way, the action mask contains 40 bits.

| Action | | | Security Mask | | | | |
|---|---|---|---|---|---|---|---|
| Action Id | Context Id | Name | Public | Low | Medium | High | Highest |
| 1 | 1 | Create | 10000000 | 10000000 | 10000000 | 10000000 | 10000000 |
| 2 | 1 | Read | 01000000 | 01000000 | 01000000 | 01000000 | 01000000 |
| 3 | 1 | Update | 00100000 | 00100000 | 00100000 | 00100000 | 00100000 |
| 4 | 1 | Delete | 00010000 | 00010000 | 00010000 | 00010000 | 00010000 |
| 5 | 1 | Execute | 00001000 | 00001000 | 00001000 | 00001000 | 00001000 |
| 6 | 1 | Audit | 00000100 | 00000100 | 00000100 | 00000100 | 00000100 |
| 7 | 1 | Approve | 00000010 | 00000010 | 00000010 | 00000010 | 00000010 |
| 8 | 1 | Custom | 00000001 | 00000001 | 00000001 | 00000001 | 00000001 |
| 9 | 2 | Create | 10000000 | 10000000 | 10000000 | 10000000 | 10000000 |
| 10 | 2 | Read | 01000000 | 01000000 | 01000000 | 01000000 | 01000000 |
| 11 | 2 | Update | 00100000 | 00100000 | 00100000 | 00100000 | 00100000 |
| 12 | 2 | Delete | 00010000 | 00010000 | 00010000 | 00010000 | 00010000 |
| 13 | 2 | Execute | 00001000 | 00001000 | 00001000 | 00001000 | 00001000 |
| 14 | 2 | Audit | 00000100 | 00000100 | 00000100 | 00000100 | 00000100 |
| 15 | 2 | Approve | 00000010 | 00000010 | 00000010 | 00000010 | 00000010 |
| 16 | 2 | Custom | 00000001 | 00000001 | 00000001 | 00000001 | 00000001 |

Resource Mask

For each Security Context i.e. for each Department, there shall be N Resources defined.

Each Resource has a binary Resource Mask having different Permission Bits for each Action, for each Level of Information Security. This way, the Resource mask contains 40 bits.

| Resource | | | Security Mask | | | | |
|---|---|---|---|---|---|---|---|
| Resource Id | Context Id | Name | Public | Low | Medium | High | Highest |
| 1 | 1 | Entity1 | 11111100 | 11111100 | 11111100 | 11111100 | 11111100 |
| 2 | 1 | Entity2 | 11111100 | 11111100 | 11111100 | 11111100 | 01000000 |
| 3 | 1 | Doc1 | 11111100 | 11111100 | 11111100 | 01000000 | 00000000 |
| 4 | 1 | Report1 | 01000000 | 00000000 | 00000000 | 00000000 | 00000000 |
| 5 | 2 | Entity3 | 01001000 | 01001000 | 01001000 | 11111100 | 11111100 |
| 6 | 2 | Entity4 | 01001000 | 01001000 | 01001000 | 01001000 | 01000000 |
| 7 | 2 | Doc2 | 11111100 | 11111100 | 11111100 | 01000000 | 00000000 |
| 8 | 2 | Report2 | 01000000 | 00000000 | 00000000 | 00000000 | 00000000 |

Location Mask

For each Security Context i.e. for each Department, there shall be N Location types defined.

Each Location type has a binary Location Mask having different Permission Bits for each Action, for each Level of Information Security. This way, the Location mask contains 40 bits.

| Location | | | Security Mask | | | | |
|---|---|---|---|---|---|---|---|
| Location Id | Context Id | Name | Public | Low | Medium | High | Highest |
| 1 | 1 | Indore | 11111100 | 11111100 | 11111100 | 11111100 | 11111100 |
| 2 | 1 | Mumbai | 11111100 | 11111100 | 11111100 | 11111100 | 01000000 |
| 3 | 1 | Delhi | 11111100 | 11111100 | 11111100 | 01000000 | 00000000 |
| 4 | 1 | Other | 01000000 | 00000000 | 00000000 | 00000000 | 00000000 |
| 5 | 2 | Indore | 11111100 | 11111100 | 11111100 | 11111100 | 11111100 |
| 6 | 2 | Mumbai | 11111100 | 11111100 | 11111100 | 11111100 | 01000000 |
| 7 | 2 | Delhi | 11111100 | 11111100 | 11111100 | 01000000 | 00000000 |
| 8 | 2 | Other | 01000000 | 00000000 | 00000000 | 00000000 | 00000000 |

Time of Day Mask

For each Security Context i.e. for each Department, there shall be N Time slots defined for a day.

Each Time slot has a binary Time of Day Mask having different Permission Bits for each Action, for each Level of Information Security. This way, the Time of Day mask contains 40 bits.

| Time of Day | | | Security Mask | | | | |
|---|---|---|---|---|---|---|---|
| Timeslot Id | Context Id | Name | Public | Low | Medium | High | Highest |
| 1 | 1 | 07 AM-09 AM | 11111100 | 11111100 | 11111100 | 11111100 | 01000000 |
| 2 | 1 | 09 AM-05 PM | 11111100 | 11111100 | 11111100 | 11111100 | 11111100 |
| 3 | 1 | 05 PM-09 PM | 11111100 | 11111100 | 11111100 | 01000000 | 00000000 |
| 4 | 1 | 09 PM-07 AM | 01000000 | 00000000 | 00000000 | 00000000 | 00000000 |
| 5 | 2 | 07 AM-09 AM | 11111100 | 11111100 | 11111100 | 11111100 | 01000000 |
| 6 | 2 | 09 AM-05 PM | 11111100 | 11111100 | 11111100 | 11111100 | 11111100 |
| 7 | 2 | 05 PM-09 PM | 11111100 | 11111100 | 11111100 | 01000000 | 00000000 |
| 8 | 2 | 09 PM-07 AM | 01000000 | 00000000 | 00000000 | 00000000 | 00000000 |

Day Mask

For each Security Context i.e. for each Department, there shall be N Day types defined e.g. working day, half day, weekend, holiday.

Each Day type has a binary Day Mask having different Permission Bits for each Action, for each Level of Information Security. This way, the Day mask contains 40 bits.

| Day type | | | Security Mask | | | | |
|---|---|---|---|---|---|---|---|
| Daytype Id | Context Id | Name | Public | Low | Medium | High | Highest |
| 1 | 1 | Working Day | 11111100 | 11111100 | 11111100 | 11111100 | 11111100 |
| 2 | 1 | Half day | 11111100 | 11111100 | 11111100 | 11111100 | 01000000 |
| 3 | 1 | Weekend | 11111100 | 11111100 | 11111100 | 01000000 | 00000000 |
| 4 | 1 | Holiday | 01000000 | 00000000 | 00000000 | 00000000 | 00000000 |
| 5 | 2 | Working Day | 11111100 | 11111100 | 11111100 | 11111100 | 11111100 |
| 6 | 2 | Half day | 11111100 | 11111100 | 11111100 | 11111100 | 01000000 |
| 7 | 2 | Weekend | 11111100 | 11111100 | 11111100 | 01000000 | 00000000 |
| 8 | 2 | Holiday | 01000000 | 00000000 | 00000000 | 00000000 | 00000000 |

Network Mask

For each Security Context i.e. for each Department, there shall be N Network types defined.

Each Network type has a binary Network Mask having different Permission Bits for each Action, for each Level of Information Security. This way, the Network mask contains 40 bits.

| Network type | | | Security Mask | | | | |
|---|---|---|---|---|---|---|---|
| Network type Id | Context Id | Name | Public | Low | Medium | High | Highest |
| 1 | 1 | Office | 11111100 | 11111100 | 11111100 | 11111100 | 11111100 |
| 2 | 1 | Home | 11111100 | 11111100 | 11111100 | 11111100 | 01000000 |

-continued

| Network type | | | Security Mask | | | | |
|---|---|---|---|---|---|---|---|
| Network type Id | Context Id | Name | Public | Low | Medium | High | Highest |
| 3 | 1 | Cyber | 11111100 | 11111100 | 11111100 | 01000000 | 00000000 |
| 4 | 1 | Public | 01000000 | 00000000 | 00000000 | 00000000 | 00000000 |
| 5 | 2 | Office | 11111100 | 11111100 | 11111100 | 11111100 | 11111100 |
| 6 | 2 | Home | 11111100 | 11111100 | 11111100 | 11111100 | 01000000 |
| 7 | 2 | Cyber | 11111100 | 11111100 | 11111100 | 01000000 | 00000000 |
| 8 | 2 | Public | 01000000 | 00000000 | 00000000 | 00000000 | 00000000 |

Device Mask

For each Security Context i.e. for each Department, there shall be N Device types defined.

Each Device type has a binary Device Mask having different Permission Bits for each Action, for each Level of Information Security. This way, the Device mask contains 40 bits.

| Device type | | | Security Mask | | | | |
|---|---|---|---|---|---|---|---|
| Device type Id | Context Id | Name | Public | Low | Medium | High | Highest |
| 1 | 1 | Office Computer | 11111100 | 11111100 | 11111100 | 11111100 | 11111100 |
| 2 | 1 | Personal Computer | 11111100 | 11111100 | 11111100 | 11111100 | 01000000 |
| 3 | 1 | Mobile Phone | 11111100 | 11111100 | 11111100 | 01000000 | 00000000 |
| 4 | 1 | Other | 01000000 | 00000000 | 00000000 | 00000000 | 00000000 |
| 5 | 2 | Office Computer | 11111100 | 11111100 | 11111100 | 11111100 | 11111100 |
| 6 | 2 | Personal Computer | 11111100 | 11111100 | 11111100 | 11111100 | 01000000 |
| 7 | 2 | Mobile Phone | 11111100 | 11111100 | 11111100 | 01000000 | 00000000 |
| 8 | 2 | Other | 01000000 | 00000000 | 00000000 | 00000000 | 00000000 |

User

User contains the regular User fields as below. User is independent of any Security Context i.e. Department.

| User | | | |
|---|---|---|---|
| User Id | Login Id | Name | Password |
| 1 | ramesh | Ramesh | ***** |
| 2 | suresh | Suresh | ***** |
| 3 | upendra | Upendra | ***** |
| 4 | vivek | Vivek | ***** |
| 5 | vrinda | Vrinda | ***** |
| 6 | chandra | Chandra | ***** |

UserRole

User Role contains mapping of a User with some defined Role. This Role binds the User with a Security Context i.e. Department. A User might be associated with N Security Contexts at a time having different Roles in different Security Context i.e. Department.

| User Id | Role Id |
|---|---|
| 1 | 1 |
| 1 | 5 |
| 2 | 3 |
| 2 | 6 |
| 3 | 2 |
| 3 | 7 |

System Startup

When the application server is started, all the above Security Masks are readed from persistent storage (File or Database) and cached into memory on a per Security Context i.e. Department basis so that Masks can be obtained in very less time. Since the Masks are binary and configuration is less, very less memory gets consumed in storing Security Masks.

User Login

When some User logs in to the system, following Attributes are captured and kept with the User's session Roles (from UserRole)
Security Contexts (from the Role)
Location
Network Type
Device Type If any of the above Attribute changes during the session, the login session should get terminated and User should be advised to login again.

User Action

When some logged-in User attempts to perform certain Action on some Resource, following attributes are captured Action
Resource
Time of Day
Working Day or Holiday Permission Check Prior to perform the Action, Access to the Resource is checked with all the Roles possessed by logged-in User in the Resource's Security Context for all of the applicable Attributes as following.

Check Preconditions
    Identify User
        Obtain the User Id of the logged in User from current session
        Throw appropriate error if User can't be identified or session is expired
    Identify Action
        Identify the Action being performed by the User
        Throw appropriate error if Action is unknown
    Identify Resource
        Identify the Resource on which the Action is being performed
        Throw appropriate error if Resource is unknown Identify Security Context i.e. Department
  Resource is the part of some Security Context, so obtain the Security Context Id from the Resource.
  Throw appropriate error if current Security Context i.e. Department can not be identified
Obtain Security Masks
  Role Mask
    Obtain all Security Masks for all the Roles of User into the current Security Context
    Binary OR all the above Role Masks to obtain User's Role Mask in the current Security Context
    Throw appropriate error if no Role is configured for the User in current Security Context
  Action Mask
    Obtain the Action's Security Mask from the above configuration
  Resource Mask
    Obtain the Resource's Security Mask from the above configuration
  Location Mask
    Obtain the current Locations's Security Mask from the above configuration
  Time Mask
    Obtain the Security Mask for current Time from the above configuration
  Day Mask
    Obtain the Security Mask of Today from the above configuration
  Network Mask
    Obtain the Security Mask for User's current Network from the above configuration
  Device Mask
    Obtain the Security Mask for User's current Device from the above configuration
Binary AND
  Perform Binary AND operation on all the above Attribute Masks to obtain the result of permission check
Result=Role Mask & Action Mask & Resource Mask & Location Mask & Time Mask & Day Mask & Network Mask & Device Mask
Result
  If the numeric value of above result is greater than zero (0) than return as permission GRANTED
  If the numeric value of above result is zero (0) than return as permission DENIED Example Scenario #1

As an example scenario, User Ramesh who has Admin Role in Security Context 1, attempts to Create Entity 1 which belongs to Security Context 1, from Location Indore, at Time 11:03:09 AM, on a Working Day, from his office Network, from his Personal Computer, following will be the sequence of events
Role Mask for Admin Role:

| 11111100 | 11111100 | 11111100 | 11111100 | 11111100 |
|---|---|---|---|---|

Action Mask for Create Action:

| 10000000 | 10000000 | 10000000 | 10000000 | 10000000 |
|---|---|---|---|---|

Resource Mask for Entity 1:

| 11111100 | 11111100 | 11111100 | 11111100 | 11111100 |
|---|---|---|---|---|

Location Mask for Indore:

| 11111100 | 11111100 | 11111100 | 11111100 | 11111100 |
|---|---|---|---|---|

Time Mask for Office Time 9 AM-5 PM:

| 11111100 | 11111100 | 11111100 | 11111100 | 11111100 |
|---|---|---|---|---|

Day Mask for Working Day:

| 11111100 | 11111100 | 11111100 | 11111100 | 11111100 |
|---|---|---|---|---|

Network Mask for Office:

| 11111100 | 11111100 | 11111100 | 11111100 | 11111100 |
|---|---|---|---|---|

Device Mask for Personal Computer:

| 11111100 | 11111100 | 11111100 | 11111100 | 01000000 |
|---|---|---|---|---|

Binary AND Operation:

```
1111110011111100111111001111110011111100 &
1000000010000000100000001000000010000000 &
1111110011111100111111001111110011111100 &
1111110011111100111111001111110011111100 &
1111110011111100111111001111110011111100 &
1111110011111100111111001111110011111100 &
1111110011111100111111001111110011111100 &
1111110011111100111111001111110000000000 =
1 000000010000000 10000000100000000 0000000
```

Result is 10000000-10000000-10000000-10000000-00000000 in binary representation which is greater than zero, hence, the permission is GRANTED here.

Example Scenario #2

As an example scenario, User Suresh who has Manager Role in Security Context 2, attempts to Create Entity 3 which belongs to Security Context 2, from Location Delhi, at Time 05:34:22 PM, on a Sunday, from a Cyber Cafe, from his Personal Computer, following will be the sequence of events Role Mask for Manager Role:

| 11111100 | 11111100 | 11111100 | 11111100 | 11111100 |
|---|---|---|---|---|

Action Mask for Create Action:

| 10000000 | 10000000 | 10000000 | 10000000 | 10000000 |
|---|---|---|---|---|

Resource Mask for Entity 3 (Security Context 2):

| 01001000 | 01001000 | 01001000 | 11111100 | 11111100 |
|----------|----------|----------|----------|----------|

Location Mask for Delhi for Security Context 2:

| 11111100 | 11111100 | 11111100 | 01000000 | 00000000 |
|----------|----------|----------|----------|----------|

Time Mask for Office Time 5 PM-9 PM for Security Context 2:

| 11111100 | 11111100 | 11111100 | 01000000 | 00000000 |
|----------|----------|----------|----------|----------|

Day Mask for Sunday for Security Context 2:

| 11111100 | 11111100 | 11111100 | 01000000 | 00000000 |
|----------|----------|----------|----------|----------|

Network Mask for Cyber Cafe for Security Context 2:

| 11111100 | 11111100 | 11111100 | 01000000 | 00000000 |
|----------|----------|----------|----------|----------|

Device Mask for Personal Computer for Security Context 2:

| 11111100 | 11111100 | 11111100 | 11111100 | 01000000 |
|----------|----------|----------|----------|----------|

Binary AND Operation:

```
11111100111111001111100111111100111111100 &
10000000100000001000000010000000010000000 &
01001000010010000100100010001111110011111100 &
11111100111111001111100011111100000000000 &
11111100111111001111100011111100000000000 &
11111100111111001111100011111100000000000 &
11111100111111001111100011111100000000000 &
11111100111111001111110011111100010000000 =
00000000 0000000000000000 00000000 0000000
```

Result is 00000000-00000000-00000000-00000000-00000000 in binary representation which is equal to zero, hence, the permission is DENIED here.

Implementing Role Based Access Control (RBAC)

Role Based Access Control (RBAC) implementations are easier than Attribute Based Access Control. Here, the focus area is limited to User, Role and Permisions; other complex Attributes are not considered while checking for the permission.

Role Mask

There shall be N Roles defined in the system.

Each Role has a binary Role Mask having different Permission Bits for each Action, for each Level of Information Security. This way, the role mask contains 40 bits for each role.

| Role | | Security Mask | | | | |
|---|---|---|---|---|---|---|
| Role Id | Name | Public | Low | Medium | High | Highest |
| 1 | Admin | 11111100 | 11111100 | 11111100 | 11111100 | 11111100 |
| 2 | Manager | 11111100 | 11111100 | 11111100 | 11111100 | 01000000 |
| 3 | Executive | 11111100 | 11111100 | 11111100 | 01000000 | 00000000 |
| 4 | Guest | 01000000 | 00000000 | 00000000 | 00000000 | 00000000 |

Action Mask

As mentioned above, there shall be 8 Actions defined into the System

Each Action has a binary Action Mask having different Permission Bits for each Action, for each Level of Information Security. This way, the action mask contains 40 bits.

| Action | | Security Mask | | | | |
|---|---|---|---|---|---|---|
| Action Id | Name | Public | Low | Medium | High | Highest |
| 1 | Create | 10000000 | 10000000 | 10000000 | 10000000 | 10000000 |
| 2 | Read | 01000000 | 01000000 | 01000000 | 01000000 | 01000000 |
| 3 | Update | 00100000 | 00100000 | 00100000 | 00100000 | 00100000 |
| 4 | Delete | 00010000 | 00010000 | 00010000 | 00010000 | 00010000 |
| 5 | Execute | 00001000 | 00001000 | 00001000 | 00001000 | 00001000 |
| 6 | Audit | 00000100 | 00000100 | 00000100 | 00000100 | 00000100 |
| 7 | Approve | 00000010 | 00000010 | 00000010 | 00000010 | 00000010 |
| 8 | Custom | 00000001 | 00000001 | 00000001 | 00000001 | 00000001 |

Resource Mask

There shall be N Resources defined into the System

Each Resource has a binary Resource Mask having different Permission Bits for each Action, for each Level of Information Security. This way, the Resource mask contains 40 bits.

| Resource | | Security Mask | | | | |
|---|---|---|---|---|---|---|
| Resource Id | Name | Public | Low | Medium | High | Highest |
| 1 | Entity1 | 11111100 | 11111100 | 11111100 | 11111100 | 11111100 |
| 2 | Entity2 | 11111100 | 11111100 | 11111100 | 11111100 | 01000000 |
| 3 | Doc1 | 11111100 | 11111100 | 11111100 | 01000000 | 00000000 |
| 4 | Report1 | 01000000 | 00000000 | 00000000 | 00000000 | 00000000 |
| 5 | Entity3 | 01001000 | 01001000 | 01001000 | 11111100 | 11111100 |
| 6 | Entity4 | 01001000 | 01001000 | 01001000 | 01001000 | 01000000 |
| 7 | Doc2 | 11111100 | 11111100 | 11111100 | 01000000 | 00000000 |
| 8 | Report2 | 01000000 | 00000000 | 00000000 | 00000000 | 00000000 |

Permission Check
Prior to perform the Action, Access to the Resource is checked with all the Roles possessed by logged-in User for all of the applicable Roles as following.
 Check Preconditions
  Identify User
   Obtain the User Id of the logged in User from current session
   Throw appropriate error if User can't be identified or session is expired
  Identify Action
   Identify the Action being performed by the User
   Throw appropriate error if Action is unknown
  Identify Resource
   Identify the Resource on which the Action is being performed
   Throw appropriate error if Resource is unknown
 Obtain Security Masks
  Role Mask
   Obtain all Security Masks for all the Roles of User
   Binary OR all the above Role Masks to obtain User's Role Mask
   Throw appropriate error if no Role is configured for the User
  Action Mask
   Obtain the Action's Security Mask from the above configuration
  Resource Mask
   Obtain the Resource's Security Mask from the above configuration
 Binary AND
  Perform Binary AND operation on all the above Security Masks to obtain the result of permission check Result=Role Mask & Action Mask & Resource Mask
 Result
  If the numeric value of above result is greater than zero (0) than return as permission GRANTED
  If the numeric value of above result is zero (0) than return as permission DENIED Example Scenario #1

As an example scenario, User Ramesh who has Admin Role, attempts to Create Entity 1, following will be the sequence of events
Role Mask for Admin Role:

| 11111100 | 11111100 | 11111100 | 11111100 | 11111100 |
|---|---|---|---|---|

Action Mask for Create Action:

| 10000000 | 10000000 | 10000000 | 10000000 | 10000000 |
|---|---|---|---|---|

Resource Mask for Entity 1:

| 11111100 | 11111100 | 11111100 | 11111100 | 11111100 |
|---|---|---|---|---|

Binary AND Operation:

| 1111110011111100111111001111110011111100 & 1000000010000000100000001000000010000000 & 1111110011111100111111001111110011111100 = 1000000010000000100000001000000010000000 |
|---|

Result is 10000000-10000000-10000000-10000000-10000000 in binary representation which is greater than zero, hence, the permission is GRANTED here.

Example Scenario #2

As an example scenario, User Suresh who has Executive Role, attempts to Create Entity 3, following will be the sequence of events
Role Mask for Admin Role:

| 11111100 | 11111100 | 11111100 | 01000000 | 00000000 |
|---|---|---|---|---|

Action Mask for Create Action:

| 10000000 | 10000000 | 10000000 | 10000000 | 10000000 |
|---|---|---|---|---|

Resource Mask for Entity 3:

| 01001000 | 01001000 | 01001000 | 11111100 | 11111100 |
|---|---|---|---|---|

Binary AND Operation:

| 1111110011111100111111000100000000000000 & 1000000010000000100000001000000010000000 & 0100100001001000010010001111110011111100 = 0000000 00000000000000000000000000000000 |
|---|

Result is 00000000-00000000-00000000-00000000-00000000 in binary representation which is equal to zero, hence, the permission is DENIED here.

Other Aspects

Persistence

Aforementioned configuration can be persisted into property files or database into single table structure or multiple table structures being one for each attribute.

Dynamicity

Depending on the organization's policy, System Administrators may be able to change above configuration at run time. Such that, any change in the permissions of some or any Attribute gets reflected without any need of application restart.

Restricted View

If above permission checks are computed before displaying the Resources and Actions to the User on the User Interface (GUI or Console etc.), Application will only display Resources and Actions which are available to the User.

Appendix A: Log Format

Following are some example lines from the load test run conducted by Selenium Test Application on BRBAC Reference Web Application.

```
INFO: LogIN User- User [ userId=ffef5be0-17fe-422a-ad47-d1784f62884c, name=user5,
loginId=user5, loginPassword=password5, permission=0xffff, ]
12July2017 10:24:47PM BaseController INFO: >>> checkPermission READ [Entity5] by [BRBAC]
method for user [user5] permission GRANTED time taken : [6] microseconds i.e. [0]
milliseconds.
12July2017 10:24:47PM BaseController INFO: >>> checkPermission READ [Entity5] by
[TRADITIONAL] method for user [user5] permission GRANTED time taken : [13766]
microseconds i.e. [14] milliseconds.
12July2017 10:24:47PM Entity5Controller listEntity5 INFO: >>> listEntity Entity5 time
taken: 8
12July2017 10:24:49PM BaseController INFO: >>> checkPermission CREATE [Entity5] by
[BRBAC] method for user [user5] permission GRANTED time taken : [6] microseconds i.e.
[0] milliseconds.
12July2017 10:24:49PM BaseController INFO: >>> checkPermission CREATE [Entity5] by
[TRADITIONAL] method for user [user5] permission GRANTED time taken : [18436]
microseconds i.e. [19] milliseconds.
12July2017 10:24:51PM BaseController INFO: >>> checkPermission CREATE [Entity5] by
[BRBAC] method for user [user5] permission GRANTED time taken : [6] microseconds i.e.
[0] milliseconds.
12July2017 10:24:51PM BaseController INFO: >>> checkPermission CREATE [Entity5] by
[TRADITIONAL] method for user [user5] permission GRANTED time taken : [9010]
microseconds i.e. [9] milliseconds.
12July2017 10:24:51PM Entity5Controller saveEntity5 INFO: >>> saveEntity Entity5 time
taken: 56
12July2017 10:24:52PM BaseController INFO: >>> checkPermission READ [Entity5] by [BRBAC]
method for user [user5] permission GRANTED time taken : [10] microseconds i.e. [0]
milliseconds.
12July2017 10:24:52PM BaseController INFO: >>> checkPermission READ [Entity5] by
[TRADITIONAL] method for user [user5] permission GRANTED time taken : [12727]
microseconds i.e. [13] milliseconds.
12July2017 10:24:52PM Entity5Controller listEntity5 INFO: >>> listEntity Entity5 time
taken: 13
12July2017 10:24:53PM BaseController INFO: >>> checkPermission UPDATE [Entity5] by
[BRBAC] method for user [user5] permission GRANTED time taken : [28] miscroseconds i.e.
[0] milliseconds.
12July2017 10:24:53PM BaseController INFO: >>> checkPermission UPDATE [Entity5] by
[TRADITIONAL] method for user [user5] permission GRANTED time taken : [17517]
microseconds i.e. [17] milliseconds.
12July2017 10:24:55PM BaseController INFO: >>> checkPermission UPDATE [Entity5] by
[BRBAC] method for user [user5] permission GRANTED time taken : [7] microseconds i.e.
[0] milliseconds.
12July2017 10:24:55PM BaseController INFO: >>> checkPermission UPDATE [Entity5] by
[TRADITIONAL] method for user [user5] permission GRANTED time taken : [7721]
microseconds i.e. [7] milliseconds.
12July2017 10:24:55PM Entity5Controller saveEntity5 INFO: >>> updateEntity Entity5 time
taken: 88
12July2017 10:24:56PM BaseController INFO: >>> checkPermission READ [Entity5] by [BRBAC]
method for user [user5] permission GRANTED time taken : [8] microseconds i.e. [0]
milliseconds.
12July2017 10:24:56PM BaseController INFO: >>> checkPermission READ [Entity5] by
[TRADITIONAL] method for user [user5] permission GRANTED time taken : [14146]
microseconds i.e. [14] milliseconds.
12July2017 10:24:56PM Entity5Controller listEntity5 INFO: >>> listEntity Entity5 time
taken: 19
12July2017 10:24:58PM BaseController INFO: >>> checkPermission DELETE [Entity5] by
[BRBAC] method for user [user5] permission GRANTED time taken : [22] microseconds i.e.
[0] milliseconds.
12July2017 10:24:58PM BaseController INFO: >>> checkPermission DELETE [Entity5] by
[TRADITIONAL] method for user [user5] permission GRANTED time taken : [15379]
microseconds i.e. [16] milliseconds.
12July2017 10:24:58PM Entity5Controller deleteEntity5 INFO: >>> deleteEntity Entity5 time
taken: 37
12July2017 10:24:58PM BaseController INFO: >>> checkPermission READ [Entity5] by [BRBAC]
method for user [user5] permission GRANTED time taken : [7] microseconds i.e. [0]
milliseconds.
```

12July2017 10:24:58PM BaseController INFO: >>> checkPermission READ [Entity5] by [TRADITIONAL] method for user [user5] permission GRANTED time taken : [15408] microseconds i.e. [16] milliseconds.
12July2017 10:24:59PM BaseController INFO: >>> checkPermission READ [Entity15] by [BRBAC] method for user [user5] permission GRANTED time taken : [6] microseconds i.e. [0] milliseconds.
12July2017 10:24:59PM BaseController INFO: >>> checkPermission READ [Entity15] by [TRADITIONAL] method for user [user5] permission GRANTED time taken : [18755] microseconds i.e. [19] milliseconds.
12July2017 10:24:59PM Entity15Controller listEntity15 INFO: >>> listEntity Entity15 time taken: 14
12July2017 10:25:01PM BaseController INFO: >>> checkPermission CREATE [Entity15] by [BRBAC] method for user [user5] permission GRANTED time taken : [16] microseconds i.e. [0] milliseconds.
12July2017 10:25:01PM BaseController INFO: >>> checkPermission CREATE [Entity15] by [TRADITIONAL] method for user [user5] permission GRANTED time taken : [19127] microseconds i.e. [19] milliseconds.
12July2017 10:25:02PM BaseController INFO: >>> checkPermission CREATE [Entity15] by [BRBAC] method for user [user5] permission GRANTED time taken : [64] microseconds i.e. [0] milliseconds.
12July2017 10:25:02PM BaseController INFO: >>> checkPermission CREATE [Entity15] by [TRADITIONAL] method for user [user5] permission GRANTED time taken : [13277] microseconds i.e. [13] milliseconds.
12July2017 10:25:02PM Entity15Controller saveEntity15 INFO: >>> saveEntity Entity15 time taken: 49
12July2017 10:25:03PM BaseController INFO: >>> checkPermission READ [Entity15] by [BRBAC] method for user [user5] permission GRANTED time taken : [8] microseconds i.e. [0] milliseconds.
12July2017 10:25:03PM BaseController INFO: >>> checkPermission READ [Entity15] by [TRADITIONAL] method for user [user5] permission GRANTED time taken : [11903] microseconds i.e. [12] milliseconds.
12July2017 10:25:03PM Entity15Controller listEntity15 INFO: >>> listEntity Entity15 time taken: 11
12July2017 10:25:05PM BaseController INFO: >>> checkPermission UPDATE [Entity15] by [BRBAC] method for user [user5] permission GRANTED time taken : [8] microseconds i.e. [0] milliseconds.
12July2017 10:25:05PM BaseController INFO: >>> checkPermission UPDATE [Entity15] by [TRADITIONAL] method for user [user5] permission GRANTED time taken : [18340] microseconds i.e. [19] milliseconds.

Appendix B: Benchmarking Commands

Following Linux commands and scripts were used to extract the benchmarking information out of above log files.

```
Extracting Time consumed in performing CRUD Actions (Milliseconds only)
$ grep ">>> saveEntity" brbac_timing.log | awk '{print $1 $2 $3 $4 $5 "\t" $10 "\t" $11 "\t" $14 }' > saveEntity_milli.time
$ grep ">>> readEntity" brbac_timing.log | awk '{print $1 $2 $3 $4 $5 "\t" $10 "\t" $11 "\t" $14 }' > readEntity_milli.time
$ grep ">>> updateEntity" brbac_timing.log | awk '{print $1 $2 $3 $4 $5 "\t" $10 "\t" $11 "\t" $14 }' > updateEntity_milli.time
$ grep ">>> deleteEntity" brbac_timing.log | awk '{print $1 $2 $3 $4 $5 "\t" $10 "\t" $11 "\t" $14 }' > deleteEntity_milli.time
Extracting Time consumed in permission checks (Microseconds & Milliseconds)
$ grep ">>> checkPermission" brbac_timing.log | grep TRADITIONAL | grep GRANTED
| awk '{print $1 $2 $3 $4 $5 "\t" $10 "\t" $11 "\t" $12 "\t" $14 "\t" $18 "\t" $20 "\t" $24 "\t" $27}' | sed 's/\[/ /g' | sed 's/\]/ /g' > checkPermission_TRADITIONAL_GRANTED_micro_milli.time
$ grep ">>> checkPermission" brbac_timing.log | grep TRADITIONAL | grep DENIED
| awk '{print $1 $2 $3 $4 $5 "\t" $10 "\t" $11 "\t" $12 "\t" $14 "\t" $18 "\t" $20 "\t" $24 "\t" $27}' | sed 's/\[/ /g' | sed 's/\]/ /g' > checkPermission_TRADITIONAL_DENIED_micro_milli.time
$ grep ">>> checkPermission" brbac_timing.log | grep BRBAC | grep GRANTED |
awk '{print $1 $2 $3 $4 $5 "\t" $10 "\t" $11 "\t" $12 "\t" $14 "\t" $18 "\t" $20 "\t" $24 "\t" $27}' | sed 's/\[/ /g' | sed 's/\]/ /g' > checkPermission_BRBAC_GRANTED_micro_milli.time
$ grep ">>> checkPermission" brbac_timing.log | grep BRBAC | grep DENIED | awk
'{print $1 $2 $3 $4 $5 "\t" $10 "\t" $11 "\t" $12 "\t" $14 "\t" $18 "\t" $20 "\t" $24 "\t" $27}' | sed 's/\[/ /g' | sed 's/\]/ /g' > checkPermission_BRBAC_DENIED_micro_milli.time
Computing statistics on CRUD Actions (Milliseconds only)
$ cat CreateReadUpdateDeleteTimeComparison.370.csv | cut -f 1 -d ',' | Rscript -
e 'summary (as.numeric (readLines ("stdin")))'
Min.      1st Qu.    Median     Mean      3rd Qu.    Max.       NA's
```

```
16.00     33.00      57.00     59.54     74.50     280.00     1
$ cat CreateReadUpdateDeleteTimeComparison.370.csv | cut -f 2 -d ',' | Rscript -
e 'summary (as.numeric (readLines ("stdin")))'
 Min.     1st Qu.    Median    Mean      3rd Qu.   Max.       NA's
 4.00     8.00       10.00     10.84     12.50     36.00      1
$ cat CreateReadUpdateDeleteTimeComparison.370.csv | cut -f 3 -d ',' | Rscript -
e 'summary (as.numeric (readLines ("stdin")))'
 Min.     1st Qu.    Median    Mean      3rd Qu.   Max.       NA's
 30.0     84.5       134.0     135.5     183.5     347.0      1
$ cat CreateReadUpdateDeleteTimeComparison.370.csv | cut -f 4 -d ',' | Rscript -
e 'summary (as.numeric (readLines ("stdin")))'
 Min.     1st Qu.    Median    Mean      3rd Qu.   Max.       NA's
 19.00    33.00      38.00     47.94     43.00     2673.00    1
Computing statistics on Traditional & BRBAC permission checks (Microseconds)
$ cat CheckPermissionTimeComparison_GRANTED.csv | cut -f 1 -d ',' | Rscript -e
'summary (as.numeric (readLines ("stdin")))'
 Min.     1st Qu.    Median    Mean      3rd Qu.   Max.
 0.0      0.0        1.0       21.6      3.0       28320.0
$ cat CheckPermissionTimeComparison_GRANTED.csv | cut -f 3 -d ',' | Rscript -e
'summary (as.numeric (readLines ("stdin")))'
 Min.     1st Qu.    Median    Mean      3rd Qu.   Max.
 6179     9136       11020     12020     13230     1779000
Computing statistics on Traditional & BRBAC permission checks (Milliseconds)
$ cat CheckPermissionTimeComparison_GRANTED.csv | cut -f 2 -d ',' | Rscript -e
'summary (as.numeric (readLines ("stdin")))'
 Min.     1st Qu.    Median    Mean      3rd Qu.   Max.
 0.00000  0.00000    0.00000   0.02246   0.00000   28.00000
$ cat CheckPermissionTimeComparison_GRANTED.csv | cut -f 4 -d ',' | Rscript -e
'summary (as.numeric (readLines ("stdin")))'
 Min.     1st Qu.    Median    Mean      3rd Qu.   Max.
 6.00     9.00       11.00     12.02     13.00     1779.00
Computing statistics on Traditional & BRBAC permission checks (Microseconds)
$ cat CheckPermissionTimeComparison_DENIED.csv | cut -f 1 -d ',' | Rscript -e
'summary (as.numeric (readLines ("stdin")))'
 Min.     1st Qu.    Median    Mean      3rd Qu.   Max.
 6.00     10.00      13.00     18.95     18.00     2502.00
$ cat CheckPermissionTimeComparison_DENIED.csv | cut -f 3 -d ',' | Rscript -e
'summary (as.numeric (readLines ("stdin")))'
 Min.     1st Qu.    Median    Mean      3rd Qu.   Max.
 7986     9960       11520     12150     13290     61150
Computing statistics on Traditional & BRBAC permission checks (Milliseconds)
$ cat CheckPermissionTimeComparison_DENIED.csv | cut -f 2 -d ',' | Rscript -e
'summary (as.numeric (readLines ("stdin")))'
 Min.     1st Qu.    Median    Mean      3rd Qu.   Max.
 0.00000  0.00000    0.00000   0.01444   0.00000   3.00000
$ cat CheckPermissionTimeComparison_DENIED.csv | cut -f 4 -d ',' | Rscript -e
'summary (as.numeric (readLines ("stdin")))'
 Min.     1st Qu.    Median    Mean      3rd Qu.   Max.
 8.00     10.00      11.00     12.16     13.00     61.00
```

Although the foregoing description of the present invention has been shown and described with reference to particular embodiments and applications thereof, it has been presented for purposes of illustration by way of examples and description and is not intended to be exhaustive or to limit the invention to the particular embodiments and applications disclosed. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

We claim:

1. A multiparty binary access control method, comprising the steps of:
   pre-establishing a binary access control model, the binary access control model comprising a binary coded permission set for each of multiple attributes associated with a set of users, the multiple attributes being selected from a set of roles, action, location, network type, device type, day of week, time of day, working day or holiday;
   establishing rights and privileges of the set of users based on correspondence relationship according to the binary coded permission set in advance for each of the multiple attributes;
   obtaining the binary coded permission sets for each of the multiple attributes requested by a user from the set of users, based on the established rights and privileges and the correspondence relationship between the multiple attributes wherein obtaining the binary coded permission sets includes receiving an action request sent by the user, and checking under the established rights and privileges associated with the respective user;
   performing a binary AND operation on all of the binary coded permission sets corresponding to the multiple attributes; and
   granting or denying the permission to the user to perform the requested action based on a result of the permission check using binary AND operation.

2. The binary access control method as claimed in claim 1, wherein each of the binary coded permission sets comprises equal number of bits for all the multiple attributes.

3. The access control method according to claim 2, wherein a length of the binary coded permission set is a product of number of actions and number of security levels.

4. The binary access control method as claimed in claim 1, wherein the step of granting and denying the permission to the user based on the binary AND operation includes:
- granting the permission to perform the action request if the numeric value after binary AND operation is greater than zero (0); or
- denying the permission to perform the action request if the numeric value of after binary AND operation is zero (0).

5. A multiparty binary access control system comprising:
- a memory unit configured to store machine-readable instructions; and
- a processing module operably connected with the memory unit, the processing module obtaining the machine-readable instructions from the memory unit, and being configured by the machine-readable instructions to:
- pre-establish a binary access control model, the binary access control model comprising a binary coded permission set for each of multiple attributes associated with a set of users, the multiple attributes being selected from a set of roles, action, location, network type, device type, day of week, time of day, working day or holiday;
- establish rights and privileges of the set of users based on correspondence relationship according to the binary coded permission set in advance for each of the multiple attributes;
- obtain the binary coded permission sets for each of the multiple attributes requested by a user from the set of users, based on the established rights and privileges role authority identifier and the correspondence relationship between the multiple attributes, wherein obtaining the binary coded permission sets includes receiving an action request sent by the user, and checking under the established rights and privileges associated with the respective user;
- perform a binary AND operation on all of the binary coded permission sets corresponding to the multiple attributes; and
- grant or deny the permission to the user to perform the requested action based on a result of the permission check using binary AND operation.

6. The multiparty binary access control system as claimed in claim 5, wherein he each of the binary coded permission sets comprises equal number of bits for all the multiple attributes.

7. The multiparty binary access control system as claimed in claim 5, wherein a length of the binary coded permission set is a product of number of actions and number of security levels.

8. The multiparty binary access control system as claimed in claim 5, wherein for granting and denying the permission to the user based on the binary addition or AND operation the processing module is configured to:
- grant the permission to perform the action request if the numeric value after binary AND operation is greater than zero (0); or
- deny the permission to perform the action request if the numeric value of after binary AND operation is zero (0).

9. The multiparty binary access control system as claimed in claim 5, wherein the processing module is configured to complete the permission checks within 500 nanoseconds.

* * * * *